US010585193B2

(12) United States Patent
Holz

(10) Patent No.: US 10,585,193 B2
(45) Date of Patent: *Mar. 10, 2020

(54) DETERMINING POSITIONAL INFORMATION OF AN OBJECT IN SPACE

(71) Applicant: Leap Motion, Inc., San Francisco, CA (US)

(72) Inventor: David Holz, San Francisco, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,185

(22) Filed: Mar. 26, 2018

(65) Prior Publication Data

US 2019/0018141 A1 Jan. 17, 2019

Related U.S. Application Data

(63) Continuation of application No. 15/625,856, filed on Jun. 16, 2017, now Pat. No. 9,927,522, which is a
(Continued)

(51) Int. Cl.
*G01S 17/36* (2006.01)
*G01S 17/42* (2006.01)
(Continued)

(52) U.S. Cl.
CPC .............. *G01S 17/36* (2013.01); *G01S 7/483* (2013.01); *G01S 7/4815* (2013.01);
(Continued)

(58) Field of Classification Search
CPC ........ G01B 11/24; G01B 11/026; G01B 7/14; G01S 17/42; G01S 17/36; G01S 7/483; G01S 7/4815; G06K 9/00201
(Continued)

(56) References Cited

U.S. PATENT DOCUMENTS 2,665,041 A 1/1954 Maffucci
4,175,862 A 11/1979 DiMatteo et al.
(Continued)

FOREIGN PATENT DOCUMENTS

CN 1984236 A 6/2007
CN 201332447 Y 10/2009
(Continued)

OTHER PUBLICATIONS

Heikkila, J., "Accurate Camera Calibration and Feature Based 3-D Reconstruction from Monocular Image Sequences", Infotech Oulu and Department of Electrical Engineering, University of Oulu, 1997, 126 pages.
(Continued)

*Primary Examiner* — Hoa Q Pham
(74) *Attorney, Agent, or Firm* — Haynes Beffel & Wolfeld LLP; Ernest J. Beffel, Jr.; Andrew L. Dunlap

(57) ABSTRACT

The technology disclosed relates to determining positional information of an object in a field of view. In particular, it relates to calculating a distance of the object from a reference such as a sensor including scanning the field of view by selectively illuminating directionally oriented light sources and measuring one or more differences in property of returning light emitted from the light sources and reflected from the object. The property can be intensity or phase difference of the light. It also relates to finding an object in a region of space. In particular, it relates to scanning the region of space with directionally controllable illumination, determining a difference in a property of the illumination received for two or more points in the scanning, and determining positional information of the object based in part upon the points in the scanning corresponding to the difference in the property.

20 Claims, 13 Drawing Sheets

Related U.S. Application Data continuation of application No. 14/214,605, filed on Mar. 14, 2014, now Pat. No. 9,702,977.

(60) Provisional application No. 61/801,479, filed on Mar. 15, 2013, provisional application No. 61/792,025, filed on Mar. 15, 2013, provisional application No. 61/800,327, filed on Mar. 15, 2013.

(51) Int. Cl.
*G01S 17/00* (2020.01)
*G01S 17/48* (2006.01)
*G01S 17/89* (2020.01)
*G01S 7/481* (2006.01)
*G01S 7/483* (2006.01)
*G01S 17/02* (2020.01)

(52) U.S. Cl.
CPC .......... *G01S 17/003* (2013.01); *G01S 17/026* (2013.01); *G01S 17/42* (2013.01); *G01S 17/48* (2013.01); *G01S 17/89* (2013.01)

(58) Field of Classification Search
USPC ................................. 356/601–623
See application file for complete search history.

(56) References Cited

U.S. PATENT DOCUMENTS

| | | | |
|---|---|---|---|
| 4,876,455 | A | 10/1989 | Sanderson et al. |
| 4,879,659 | A | 11/1989 | Bowlin et al. |
| 4,893,223 | A | 1/1990 | Arnold |
| 5,038,258 | A | 8/1991 | Koch et al. |
| 5,134,661 | A | 7/1992 | Reinsch |
| 5,282,067 | A | 1/1994 | Liu |
| 5,434,617 | A | 7/1995 | Bianchi |
| 5,454,043 | A | 9/1995 | Freeman |
| 5,574,511 | A | 11/1996 | Yang et al. |
| 5,581,276 | A | 12/1996 | Cipolla et al. |
| 5,594,469 | A | 1/1997 | Freeman et al. |
| 5,659,475 | A | 8/1997 | Brown |
| 5,691,737 | A | 11/1997 | Ito et al. |
| 5,742,263 | A | 4/1998 | Wang et al. |
| 5,900,863 | A | 5/1999 | Numazaki |
| 5,940,538 | A | 8/1999 | Spiegel et al. |
| 6,002,808 | A | 12/1999 | Freeman |
| 6,031,161 | A | 2/2000 | Baltenberger |
| 6,031,661 | A | 2/2000 | Tanaami |
| 6,072,494 | A | 6/2000 | Nguyen |
| 6,075,895 | A | 6/2000 | Qiao et al. |
| 6,147,678 | A | 11/2000 | Kumar et al. |
| 6,154,558 | A | 11/2000 | Hsieh |
| 6,181,343 | B1 | 1/2001 | Lyons |
| 6,184,326 | B1 | 2/2001 | Razavi et al. |
| 6,184,926 | B1 | 2/2001 | Khosravi et al. |
| 6,195,104 | B1 | 2/2001 | Lyons |
| 6,204,852 | B1 | 3/2001 | Kumar et al. |
| 6,252,598 | B1 | 6/2001 | Segen |
| 6,263,091 | B1 | 7/2001 | Jain et al. |
| 6,346,933 | B1 | 2/2002 | Lin |
| 6,417,970 | B1 | 7/2002 | Travers et al. |
| 6,463,402 | B1 | 10/2002 | Bennett et al. |
| 6,492,986 | B1 | 12/2002 | Metaxas et al. |
| 6,493,041 | B1 | 12/2002 | Hanko et al. |
| 6,498,628 | B2 | 12/2002 | Iwamura |
| 6,578,203 | B1 | 6/2003 | Anderson, Jr. et al. |
| 6,603,867 | B1 | 8/2003 | Sugino et al. |
| 6,661,918 | B1 | 12/2003 | Gordon et al. |
| 6,674,877 | B1 | 1/2004 | Jojic et al. |
| 6,702,494 | B2 | 3/2004 | Dumler et al. |
| 6,734,911 | B1 | 5/2004 | Lyons |
| 6,738,424 | B1 | 5/2004 | Allmen et al. |
| 6,771,294 | B1 | 8/2004 | Pulli et al. |
| 6,798,628 | B1 | 9/2004 | Macbeth |
| 6,804,654 | B2 | 10/2004 | Kobylevsky et al. |
| 6,804,656 | B1 | 10/2004 | Rosenfeld et al. |
| 6,814,656 | B2 | 11/2004 | Rodriguez |
| 6,819,796 | B2 | 11/2004 | Hong et al. |
| 6,901,170 | B1 | 5/2005 | Terada et al. |
| 6,919,880 | B2 | 7/2005 | Morrison et al. |
| 6,950,534 | B2 | 9/2005 | Cohen et al. |
| 6,993,157 | B1 | 1/2006 | Oue et al. |
| 7,152,024 | B2 | 12/2006 | Marschner et al. |
| 7,213,707 | B2 | 5/2007 | Hubbs et al. |
| 7,215,828 | B2 | 5/2007 | Luo |
| 7,244,233 | B2 | 7/2007 | Krantz et al. |
| 7,257,237 | B1 | 8/2007 | Luck et al. |
| 7,259,873 | B2 | 8/2007 | Sikora et al. |
| 7,308,112 | B2 | 12/2007 | Fujimura et al. |
| 7,340,077 | B2 | 3/2008 | Gokturk et al. |
| 7,483,049 | B2 | 1/2009 | Aman et al. |
| 7,519,223 | B2 | 4/2009 | Dehlin et al. |
| 7,532,206 | B2 | 5/2009 | Morrison et al. |
| 7,536,032 | B2 | 5/2009 | Bell |
| 7,542,586 | B2 | 6/2009 | Johnson |
| 7,598,942 | B2 | 10/2009 | Underkoffler et al. |
| 7,606,417 | B2 | 10/2009 | Steinberg et al. |
| 7,646,372 | B2 | 1/2010 | Marks et al. |
| 7,656,372 | B2 | 2/2010 | Sato et al. |
| 7,665,041 | B2 | 2/2010 | Wilson et al. |
| 7,692,625 | B2 | 4/2010 | Morrison et al. |
| 7,831,932 | B2 | 11/2010 | Josephsoon et al. |
| 7,840,031 | B2 | 11/2010 | Albertson et al. |
| 7,861,188 | B2 | 12/2010 | Josephsoon et al. |
| 7,940,885 | B2 | 5/2011 | Stanton et al. |
| 7,948,493 | B2 | 5/2011 | Klefenz et al. |
| 7,961,174 | B1 | 6/2011 | Markovic et al. |
| 7,961,934 | B2 | 6/2011 | Thrun et al. |
| 7,971,156 | B2 | 6/2011 | Albertson et al. |
| 7,980,885 | B2 | 7/2011 | Gattwinkel et al. |
| 8,023,698 | B2 | 9/2011 | Niwa et al. |
| 8,035,624 | B2 | 10/2011 | Bell et al. |
| 8,045,825 | B2 | 10/2011 | Shimoyama et al. |
| 8,064,704 | B2 | 11/2011 | Kim et al. |
| 8,085,339 | B2 | 12/2011 | Marks |
| 8,086,971 | B2 | 12/2011 | Radivojevic et al. |
| 8,111,239 | B2 | 2/2012 | Pryor et al. |
| 8,112,719 | B2 | 2/2012 | Hsu et al. |
| 8,144,233 | B2 | 3/2012 | Fukuyama |
| 8,185,176 | B2 | 5/2012 | Mangat et al. |
| 8,213,707 | B2 | 7/2012 | Li et al. |
| 8,218,858 | B2 | 7/2012 | Gu |
| 8,229,134 | B2 | 7/2012 | Duraiswami et al. |
| 8,235,529 | B1 | 8/2012 | Raffle et al. |
| 8,244,233 | B2 | 8/2012 | Chang et al. |
| 8,249,345 | B2 | 8/2012 | Wu et al. |
| 8,270,669 | B2 | 9/2012 | Aichi et al. |
| 8,289,162 | B2 | 10/2012 | Mooring et al. |
| 8,290,208 | B2 | 10/2012 | Kurtz et al. |
| 8,304,727 | B2 | 11/2012 | Lee et al. |
| 8,319,832 | B2 | 11/2012 | Nagata et al. |
| 8,363,010 | B2 | 1/2013 | Nagata |
| 8,395,600 | B2 | 3/2013 | Kawashima et al. |
| 8,432,377 | B2 | 4/2013 | Newton |
| 8,471,848 | B2 | 6/2013 | Tschesnok |
| 8,514,221 | B2 | 8/2013 | King et al. |
| 8,553,037 | B2 | 10/2013 | Smith et al. |
| 8,582,809 | B2 | 11/2013 | Halimeh et al. |
| 8,593,417 | B2 | 11/2013 | Kawashima et al. |
| 8,605,202 | B2 | 12/2013 | Muijs et al. |
| 8,631,355 | B2 | 1/2014 | Murillo et al. |
| 8,638,989 | B2 | 1/2014 | Holz |
| 8,659,594 | B2 | 2/2014 | Kim et al. |
| 8,659,658 | B2 | 2/2014 | Vassigh et al. |
| 8,686,943 | B1 | 4/2014 | Rafii |
| 8,693,731 | B2 | 4/2014 | Holz et al. |
| 8,738,523 | B1 | 5/2014 | Sanchez et al. |
| 8,744,122 | B2 | 6/2014 | Salgian et al. |
| 8,768,022 | B2 | 7/2014 | Miga et al. |
| 8,817,087 | B2 | 8/2014 | Weng et al. |
| 8,842,084 | B2 | 9/2014 | Andersson et al. |
| 8,843,857 | B2 | 9/2014 | Berkes et al. |
| 8,872,914 | B2 | 10/2014 | Gobush |
| 8,878,749 | B1 | 11/2014 | Wu et al. |

(56) References Cited

U.S. PATENT DOCUMENTS

| | | |
|---|---|---|
| 8,891,868 B1 | 11/2014 | Ivanchenko |
| 8,907,982 B2 | 12/2014 | Zontrop et al. |
| 8,922,590 B1 | 12/2014 | Luckett, Jr. et al. |
| 8,929,609 B2 | 1/2015 | Padovani et al. |
| 8,930,852 B2 | 1/2015 | Chen et al. |
| 8,942,881 B2 | 1/2015 | Hobbs et al. |
| 8,954,340 B2 | 2/2015 | Sanchez et al. |
| 8,957,857 B2 | 2/2015 | Lee et al. |
| 9,014,414 B2 | 4/2015 | Katano et al. |
| 9,056,396 B1 | 6/2015 | Linnell |
| 9,070,019 B2 | 6/2015 | Holz |
| 9,119,670 B2 | 9/2015 | Yang et al. |
| 9,122,354 B2 | 9/2015 | Sharma |
| 9,124,778 B1 | 9/2015 | Crabtree |
| 9,459,697 B2 | 10/2016 | Bedikian et al. |
| 9,702,977 B2 | 7/2017 | Holz |
| 9,927,522 B2 * | 3/2018 | Holz .................. G01S 17/42 |
| 2001/0044858 A1 | 11/2001 | Rekimoto |
| 2001/0052985 A1 | 12/2001 | Ono |
| 2002/0008139 A1 | 1/2002 | Albertelli |
| 2002/0008211 A1 | 1/2002 | Kask |
| 2002/0041327 A1 | 4/2002 | Hildreth et al. |
| 2002/0080094 A1 | 6/2002 | Biocca et al. |
| 2002/0105484 A1 | 8/2002 | Navab et al. |
| 2003/0053658 A1 | 3/2003 | Pavlidis |
| 2003/0053659 A1 | 3/2003 | Pavlidis et al. |
| 2003/0081141 A1 | 5/2003 | Mazzapica |
| 2003/0123703 A1 | 7/2003 | Pavlidis et al. |
| 2003/0152289 A1 | 8/2003 | Luo |
| 2003/0202697 A1 | 10/2003 | Simard et al. |
| 2004/0103111 A1 | 5/2004 | Miller et al. |
| 2004/0125228 A1 | 7/2004 | Dougherty |
| 2004/0125984 A1 | 7/2004 | Ito et al. |
| 2004/0145809 A1 | 7/2004 | Brenner |
| 2004/0155877 A1 | 8/2004 | Hong et al. |
| 2004/0212725 A1 | 10/2004 | Raskar |
| 2005/0007673 A1 | 1/2005 | Chaoulov et al. |
| 2005/0068518 A1 | 3/2005 | Baney et al. |
| 2005/0094019 A1 | 5/2005 | Grosvenor et al. |
| 2005/0131607 A1 | 6/2005 | Breed |
| 2005/0156888 A1 | 7/2005 | Xie et al. |
| 2005/0168578 A1 | 8/2005 | Gobush |
| 2005/0236558 A1 | 10/2005 | Nabeshima et al. |
| 2005/0238201 A1 | 10/2005 | Shamaie |
| 2006/0017807 A1 | 1/2006 | Lee et al. |
| 2006/0028656 A1 | 2/2006 | Venkatesh et al. |
| 2006/0029296 A1 | 2/2006 | King et al. |
| 2006/0034545 A1 | 2/2006 | Mattes et al. |
| 2006/0050979 A1 | 3/2006 | Kawahara |
| 2006/0072105 A1 | 4/2006 | Wagner |
| 2006/0098899 A1 | 5/2006 | King et al. |
| 2006/0204040 A1 | 9/2006 | Freeman et al. |
| 2006/0210112 A1 | 9/2006 | Cohen et al. |
| 2006/0262421 A1 | 11/2006 | Matsumoto et al. |
| 2006/0290950 A1 | 12/2006 | Platt et al. |
| 2007/0014466 A1 | 1/2007 | Baldwin |
| 2007/0042346 A1 | 2/2007 | Weller |
| 2007/0076224 A1 * | 4/2007 | Alexander ............... G06T 17/00 356/610 |
| 2007/0086621 A1 | 4/2007 | Aggarwal et al. |
| 2007/0130547 A1 | 6/2007 | Boillot |
| 2007/0206719 A1 | 9/2007 | Suryanarayanan et al. |
| 2007/0230929 A1 | 10/2007 | Niwa et al. |
| 2007/0238956 A1 | 10/2007 | Haras et al. |
| 2008/0013826 A1 | 1/2008 | Hillis et al. |
| 2008/0019576 A1 | 1/2008 | Senftner et al. |
| 2008/0030429 A1 | 2/2008 | Hailpern et al. |
| 2008/0031492 A1 | 2/2008 | Lanz |
| 2008/0056752 A1 | 3/2008 | Denton et al. |
| 2008/0064954 A1 | 3/2008 | Adams et al. |
| 2008/0106637 A1 | 5/2008 | Nakao et al. |
| 2008/0106746 A1 | 5/2008 | Shpunt et al. |
| 2008/0110994 A1 | 5/2008 | Knowles et al. |
| 2008/0118091 A1 | 5/2008 | Serfaty et al. |
| 2008/0126937 A1 | 5/2008 | Pachet |
| 2008/0187175 A1 | 8/2008 | Kim et al. |
| 2008/0244468 A1 | 10/2008 | Nishihara et al. |
| 2008/0246759 A1 | 10/2008 | Summers |
| 2008/0273764 A1 | 11/2008 | Scholl |
| 2008/0278589 A1 | 11/2008 | Thorn |
| 2008/0291160 A1 | 11/2008 | Rabin |
| 2008/0304740 A1 | 12/2008 | Sun et al. |
| 2008/0319356 A1 | 12/2008 | Cain et al. |
| 2009/0002489 A1 | 1/2009 | Yang et al. |
| 2009/0093307 A1 | 4/2009 | Miyaki |
| 2009/0102840 A1 | 4/2009 | Li |
| 2009/0103780 A1 | 4/2009 | Nishihara et al. |
| 2009/0116742 A1 | 5/2009 | Nishihara |
| 2009/0122146 A1 | 5/2009 | Zalewski et al. |
| 2009/0153655 A1 | 6/2009 | Ike et al. |
| 2009/0203993 A1 | 8/2009 | Mangat et al. |
| 2009/0203994 A1 | 8/2009 | Mangat et al. |
| 2009/0217211 A1 | 8/2009 | Hildreth et al. |
| 2009/0257623 A1 | 10/2009 | Tang et al. |
| 2009/0274339 A9 | 11/2009 | Cohen et al. |
| 2009/0309710 A1 | 12/2009 | Kakinami |
| 2010/0013832 A1 | 1/2010 | Xiao et al. |
| 2010/0020078 A1 | 1/2010 | Shpunt |
| 2010/0023015 A1 | 1/2010 | Park |
| 2010/0026963 A1 | 2/2010 | Faulstich |
| 2010/0027845 A1 | 2/2010 | Kim et al. |
| 2010/0046842 A1 | 2/2010 | Conwell |
| 2010/0053164 A1 | 3/2010 | Imai et al. |
| 2010/0053209 A1 | 3/2010 | Rauch et al. |
| 2010/0053612 A1 | 3/2010 | Ou-Yang et al. |
| 2010/0058252 A1 | 3/2010 | Ko |
| 2010/0066737 A1 | 3/2010 | Liu |
| 2010/0066975 A1 | 3/2010 | Rehnstrom |
| 2010/0091110 A1 | 4/2010 | Hildreth |
| 2010/0118123 A1 | 5/2010 | Freedman et al. |
| 2010/0121189 A1 | 5/2010 | Ma et al. |
| 2010/0125815 A1 | 5/2010 | Wang et al. |
| 2010/0127995 A1 | 5/2010 | Rigazio et al. |
| 2010/0141762 A1 | 6/2010 | Siann et al. |
| 2010/0158372 A1 | 6/2010 | Kim et al. |
| 2010/0177929 A1 | 7/2010 | Kurtz et al. |
| 2010/0194863 A1 | 8/2010 | Lopes et al. |
| 2010/0199230 A1 | 8/2010 | Latta et al. |
| 2010/0199232 A1 | 8/2010 | Mistry et al. |
| 2010/0201880 A1 | 8/2010 | Iwamura |
| 2010/0208942 A1 | 8/2010 | Porter et al. |
| 2010/0219934 A1 | 9/2010 | Matsumoto |
| 2010/0222102 A1 | 9/2010 | Rodriguez |
| 2010/0245289 A1 | 9/2010 | Svajda |
| 2010/0264833 A1 | 10/2010 | Van Endert et al. |
| 2010/0277411 A1 | 11/2010 | Yee et al. |
| 2010/0296698 A1 | 11/2010 | Lien et al. |
| 2010/0302015 A1 | 12/2010 | Kipman et al. |
| 2010/0302357 A1 | 12/2010 | Hsu et al. |
| 2010/0303298 A1 | 12/2010 | Marks et al. |
| 2010/0306712 A1 | 12/2010 | Snook et al. |
| 2010/0309097 A1 | 12/2010 | Raviv et al. |
| 2011/0007072 A1 | 1/2011 | Khan et al. |
| 2011/0025818 A1 | 2/2011 | Gallmeier et al. |
| 2011/0026765 A1 | 2/2011 | Ivanich et al. |
| 2011/0043806 A1 | 2/2011 | Guetta et al. |
| 2011/0057875 A1 | 3/2011 | Shigeta et al. |
| 2011/0066984 A1 | 3/2011 | Li |
| 2011/0080470 A1 | 4/2011 | Kuno et al. |
| 2011/0080490 A1 | 4/2011 | Clarkson et al. |
| 2011/0093820 A1 | 4/2011 | Zhang et al. |
| 2011/0107216 A1 | 5/2011 | Bi |
| 2011/0115486 A1 | 5/2011 | Frohlich et al. |
| 2011/0116684 A1 | 5/2011 | Coffman et al. |
| 2011/0119640 A1 | 5/2011 | Berkes et al. |
| 2011/0134112 A1 | 6/2011 | Koh et al. |
| 2011/0148875 A1 | 6/2011 | Kim et al. |
| 2011/0169726 A1 | 7/2011 | Holmdahl et al. |
| 2011/0173574 A1 | 7/2011 | Clavin et al. |
| 2011/0176146 A1 | 7/2011 | Alvarez Diez et al. |
| 2011/0181509 A1 | 7/2011 | Rautiainen et al. |
| 2011/0193778 A1 | 8/2011 | Lee et al. |
| 2011/0205151 A1 | 8/2011 | Newton et al. |
| 2011/0213664 A1 | 9/2011 | Osterhout et al. |

(56) References Cited

U.S. PATENT DOCUMENTS

| | | |
|---|---|---|
| 2011/0228978 A1 | 9/2011 | Chen et al. |
| 2011/0234840 A1 | 9/2011 | Klefenz et al. |
| 2011/0243451 A1 | 10/2011 | Oyaizu |
| 2011/0251896 A1 | 10/2011 | Impollonia et al. |
| 2011/0261178 A1 | 10/2011 | Lo et al. |
| 2011/0267259 A1 | 11/2011 | Tidemand et al. |
| 2011/0279397 A1 | 11/2011 | Rimon et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304600 A1 | 12/2011 | Yoshida |
| 2011/0304650 A1 | 12/2011 | Campillo et al. |
| 2011/0310007 A1 | 12/2011 | Margolis et al. |
| 2011/0310220 A1 | 12/2011 | McEldowney |
| 2011/0314427 A1 | 12/2011 | Sundararajan |
| 2012/0038637 A1 | 2/2012 | Marks |
| 2012/0050157 A1 | 3/2012 | Latta et al. |
| 2012/0065499 A1 | 3/2012 | Chono |
| 2012/0068914 A1 | 3/2012 | Jacobsen et al. |
| 2012/0092254 A1 | 4/2012 | Wong et al. |
| 2012/0113316 A1 | 5/2012 | Ueta et al. |
| 2012/0159380 A1 | 6/2012 | Kocienda et al. |
| 2012/0163675 A1 | 6/2012 | Joo et al. |
| 2012/0194517 A1 | 8/2012 | Izadi et al. |
| 2012/0204133 A1 | 8/2012 | Guendelman et al. |
| 2012/0223959 A1 | 9/2012 | Lengeling |
| 2012/0236288 A1 | 9/2012 | Stanley |
| 2012/0250936 A1 | 10/2012 | Holmgren |
| 2012/0270654 A1 | 10/2012 | Padovani et al. |
| 2012/0274781 A1 | 11/2012 | Shet et al. |
| 2012/0281873 A1 | 11/2012 | Brown et al. |
| 2012/0293667 A1 | 11/2012 | Baba et al. |
| 2012/0314030 A1 | 12/2012 | Datta et al. |
| 2012/0320080 A1 | 12/2012 | Giese et al. |
| 2013/0019204 A1 | 1/2013 | Kotler et al. |
| 2013/0038694 A1 | 2/2013 | Nichani et al. |
| 2013/0044951 A1 | 2/2013 | Cherng et al. |
| 2013/0050425 A1 | 2/2013 | Im et al. |
| 2013/0086531 A1 | 4/2013 | Sugita et al. |
| 2013/0097566 A1 | 4/2013 | Berglund |
| 2013/0120319 A1 | 5/2013 | Givon |
| 2013/0148852 A1 | 6/2013 | Partis et al. |
| 2013/0182079 A1 | 7/2013 | Holz |
| 2013/0182897 A1 | 7/2013 | Holz |
| 2013/0187952 A1 | 7/2013 | Berkovich et al. |
| 2013/0191911 A1 | 7/2013 | Dellinger et al. |
| 2013/0208948 A1 | 8/2013 | Berkovich et al. |
| 2013/0222640 A1 | 8/2013 | Baek et al. |
| 2013/0239059 A1 | 9/2013 | Chen et al. |
| 2013/0241832 A1 | 9/2013 | Rimon et al. |
| 2013/0252691 A1 | 9/2013 | Alexopoulos |
| 2013/0257736 A1 | 10/2013 | Hou et al. |
| 2013/0258140 A1 | 10/2013 | Lipson et al. |
| 2013/0271397 A1 | 10/2013 | MacDougall et al. |
| 2013/0300831 A1 | 11/2013 | Mavromatis et al. |
| 2013/0307935 A1 | 11/2013 | Rappel et al. |
| 2013/0321265 A1 | 12/2013 | Bychkov et al. |
| 2014/0002365 A1 | 1/2014 | Ackley et al. |
| 2014/0010441 A1 | 1/2014 | Shamaie |
| 2014/0064566 A1 | 3/2014 | Shreve et al. |
| 2014/0081521 A1 | 3/2014 | Frojdh et al. |
| 2014/0085203 A1 | 3/2014 | Kobayashi |
| 2014/0125775 A1 | 5/2014 | Holz |
| 2014/0125813 A1 | 5/2014 | Holz |
| 2014/0132738 A1 | 5/2014 | Ogura et al. |
| 2014/0134733 A1 | 5/2014 | Wu et al. |
| 2014/0139425 A1 | 5/2014 | Sakai |
| 2014/0139641 A1 | 5/2014 | Holz |
| 2014/0157135 A1 | 6/2014 | Lee et al. |
| 2014/0161311 A1 | 6/2014 | Kim |
| 2014/0168062 A1 | 6/2014 | Katz et al. |
| 2014/0176420 A1 | 6/2014 | Zhou et al. |
| 2014/0177913 A1 | 6/2014 | Holz |
| 2014/0189579 A1 | 7/2014 | Rimon et al. |
| 2014/0192024 A1 | 7/2014 | Holz |
| 2014/0201666 A1 | 7/2014 | Bedikian et al. |
| 2014/0201689 A1 | 7/2014 | Bedikian et al. |
| 2014/0222385 A1 | 8/2014 | Muenster et al. |
| 2014/0223385 A1 | 8/2014 | Ton et al. |
| 2014/0225826 A1 | 8/2014 | Juni |
| 2014/0240215 A1 | 8/2014 | Tremblay et al. |
| 2014/0240225 A1 | 8/2014 | Eilat |
| 2014/0248950 A1 | 9/2014 | Bautista |
| 2014/0253512 A1 | 9/2014 | Narikawa et al. |
| 2014/0253785 A1 | 9/2014 | Chan et al. |
| 2014/0267098 A1 | 9/2014 | Na et al. |
| 2014/0282282 A1 | 9/2014 | Holz |
| 2014/0307920 A1 | 10/2014 | Holz |
| 2014/0344762 A1 | 11/2014 | Grasset et al. |
| 2014/0364209 A1 | 12/2014 | Perry |
| 2014/0364212 A1 | 12/2014 | Osman et al. |
| 2014/0369558 A1 | 12/2014 | Holz |
| 2014/0375547 A1 | 12/2014 | Katz et al. |
| 2015/0003673 A1 | 1/2015 | Fletcher |
| 2015/0009149 A1 | 1/2015 | Gharib et al. |
| 2015/0016777 A1 | 1/2015 | Abovitz et al. |
| 2015/0022447 A1 | 1/2015 | Hare et al. |
| 2015/0029091 A1 | 1/2015 | Nakashima et al. |
| 2015/0084864 A1 | 3/2015 | Geiss et al. |
| 2015/0097772 A1 | 4/2015 | Starner |
| 2015/0115802 A1 | 4/2015 | Kuti et al. |
| 2015/0116214 A1 | 4/2015 | Grunnet-Jepsen et al. |
| 2015/0131859 A1 | 5/2015 | Kim et al. |
| 2015/0172539 A1 | 6/2015 | Neglur |
| 2015/0193669 A1 | 7/2015 | Gu et al. |
| 2015/0205358 A1 | 7/2015 | Lyren |
| 2015/0205400 A1 | 7/2015 | Hwang et al. |
| 2015/0206321 A1 | 7/2015 | Scavezze et al. |
| 2015/0227795 A1 | 8/2015 | Starner et al. |
| 2015/0234569 A1 | 8/2015 | Hess |
| 2015/0253428 A1 | 9/2015 | Holz |
| 2015/0258432 A1 | 9/2015 | Stafford et al. |
| 2015/0261291 A1 | 9/2015 | Mikhailov et al. |
| 2015/0304593 A1 | 10/2015 | Sakai |
| 2015/0323785 A1 | 11/2015 | Fukata et al. |
| 2016/0062573 A1 | 3/2016 | Dascola et al. |
| 2016/0086046 A1 | 3/2016 | Holz et al. |
| 2016/0093105 A1 | 3/2016 | Rimon et al. |

FOREIGN PATENT DOCUMENTS

| | | |
|---|---|---|
| CN | 101729808 A | 6/2010 |
| CN | 101930610 A | 12/2010 |
| CN | 101951474 A | 1/2011 |
| CN | 102053702 A | 5/2011 |
| CN | 201859393 U | 6/2011 |
| CN | 102201121 A | 9/2011 |
| CN | 102236412 A | 11/2011 |
| DE | 4201934 A1 | 7/1993 |
| DE | 10326035 A1 | 1/2005 |
| DE | 102007015495 A1 | 10/2007 |
| DE | 102007015497 B4 | 1/2014 |
| EP | 0999542 A1 | 5/2000 |
| EP | 1477924 A2 | 11/2004 |
| EP | 1837665 A2 | 9/2007 |
| EP | 2369443 A2 | 9/2011 |
| GB | 2419433 A | 4/2006 |
| GB | 2480140 A | 11/2011 |
| GB | 2519418 A | 4/2015 |
| JP | H02236407 A | 9/1990 |
| JP | H08261721 A | 10/1996 |
| JP | H09259278 A | 10/1997 |
| JP | 2000023038 A | 1/2000 |
| JP | 2002-133400 A | 5/2002 |
| JP | 2003256814 A | 9/2003 |
| JP | 2004246252 A | 9/2004 |
| JP | 2006019526 A | 1/2006 |
| JP | 2006259829 A | 9/2006 |
| JP | 2007272596 A | 10/2007 |
| JP | 2008227569 A | 9/2008 |

(56) References Cited

FOREIGN PATENT DOCUMENTS

| | | | |
|---|---|---|---|
| JP | 2009031939 A | 2/2009 |
| JP | 2009037594 A | 2/2009 |
| JP | 2010-060548 A | 3/2010 |
| JP | 2011010258 A | 1/2011 |
| JP | 2011065652 A | 3/2011 |
| JP | 2011-107681 A | 6/2011 |
| JP | 4906960 B2 | 3/2012 |
| JP | 2012-527145 A | 11/2012 |
| KR | 101092909 B1 | 6/2011 |
| RU | 2422878 C1 | 6/2011 |
| TW | 200844871 A | 11/2008 |
| WO | 1994026057 A1 | 11/1994 |
| WO | 2004114220 A1 | 12/2004 |
| WO | 2006020846 A2 | 2/2006 |
| WO | 2007137093 A2 | 11/2007 |
| WO | 201007662 A1 | 1/2010 |
| WO | 2010032268 A2 | 3/2010 |
| WO | 2010076622 A2 | 7/2010 |
| WO | 2010088035 A2 | 8/2010 |
| WO | 20100138741 A1 | 12/2010 |
| WO | 2011024193 A2 | 3/2011 |
| WO | 2011036618 A2 | 3/2011 |
| WO | 2011044680 A1 | 4/2011 |
| WO | 2011045789 A1 | 4/2011 |
| WO | 2011119154 A1 | 9/2011 |
| WO | 2012027422 A2 | 3/2012 |
| WO | 2013109608 A2 | 7/2013 |
| WO | 2013109609 A2 | 7/2013 |
| WO | 2014208087 A1 | 12/2014 |
| WO | 2015026707 A1 | 2/2015 |

OTHER PUBLICATIONS

PCT/US2013/021709—International Preliminary Report on Patentability dated Jul. 22, 2014, 22 pages.
U.S. Appl. No. 13/414,485—Office Action dated Nov. 4, 29 pages.
U.S. Appl. No. 15/253,741—Office Action dated Jan. 13, 2014, 53 pages.
U.S. Appl. No. 141/23,370—Office Action dated Jan. 13, 2017, 33 pages.
Gorce et al., "Model-Based 3D Hand Pose Estimation from Monocular Video", Feb. 24, 2011 [retrieved Jul. 15, 2016], IEEE Transac Pattern Analysis and Machine Intell, vol. 33, Issue: 9, pp. 1793-1805, Retri Internet: <http://ieeexplore.ieee.org/xpl/logi n .jsp ?tp=&arnu mber=571 9617 &u rl=http%3A %2 F%2 Fieeexplore.ieee.org%2Fxpls%2 Fabs all.jsp%3Farnumber%3D5719617>.
Oka et al., "Real-Time Fingertip Tracking and Gesture Recognition", Nov./Dec. 2002 [retrieved Jul. 15, 2016], IEEE Computer Graphics and Applications, vol. 22, Issue: 6, pp. 64-71. Retrieved from the Internet: <http://ieeexplore.ieee.org/xpl/login.jsp?tp=&arnumber=1046630&url=http%3A%2F%2Fieeexplore.ieee.org%2Fxpls%2Fabsall.jsp%3Farnumber%3D1046630>.
JP 2010-060548 A—Japanese Patent with English Abstract filed Mar. 18, 2010, 19 pages.
JP 2011-107681 A—Japanese Patent with English Abstract filed Jun. 2, 2011, 16 pages.
JP 2012-527145 A—Japanese Patent with English Abstract filed Nov. 1, 2012, 30 pages.
Pedersini, et al., Accurate Surface Reconstruction from Apparent Contours, Sep. 5-8, 2000 European Signal Processing Conference EUSIPCO 2000, vol. 4, Retrieved from the Internet: http://home.deib.polimi.it/sarti/CV_and_publications.html, pp. 1-4.
PCT/US2014/028265, Application (Determining Positional Information for an Object in Space), May 9, 2014, 117 pages.
VCNL4020 Vishay Semiconductors. Datasheet [online]. Vishay Intertechnology, Inc, Doc No. 83476, Rev. 1.3, Oct. 29, 2013 [retrieved Mar. 4, 2014]. Retrieved from the Internet: <www.vishay.com>. 16 pages.
VCNL4020 Vishay Semiconductors. Application Note [online]. Designing VCNL4020 into an Application. Vishay Intertechnology, Inc, Doc No. 84136, Revised May 22, 2012 [retrieved Mar. 4, 2014]. Retrieved from the Internet: <www.vishay.com>. 21 pages.
Schaar, R., VCNL4020 Vishay Semiconductors. Application Note [online]. Extended Detection Range with VCNL Family of Proximity Sensor Vishay Intertechnology, Inc, Doc No. 84225, Revised Oct. 25, 2013 [retrieved Mar. 4, 2014]. Retrieved from the Internet: <www.vishay.com>. 4 pages.
PCT/US2014/028265, International Search Report and Written Opinion, dated Jan. 7, 2015, 15 pages.
PCT/US2013/021713, International Search Report, dated Sep. 11, 2013, 7 pages (WO 2013/109609).
Olsson, K., et al., "Shape from Silhouette Scanner—Creating a Digital 3D Model of a Real Object by Analyzing Photos From Multiple Views," University of Linkoping, Sweden, Copyright VCG 2001, Retrieved from the Internet: <http://liu.diva-portal.org/smash/get/diva2:18671/FULLTEXT01> on Jun. 17, 2013, 52 pages.
Forbes, K., et al., "Using Silhouette Consistency Constraints to Build 3D Models," University of Cape Town, Copyright De Beers 2003, Retrieved from the Internet: <http://www.dip.ee.uct.ac.za/~kforbes/Publications/Forbes2003Prasa.pdf> on Jun. 17, 2013, 6 pages.
Cumani, A., et al., "Recovering the 3D Structure of Tubular Objects from Stereo Silhouettes," Pattern Recognition, Elsevier, GB, vol. 30, No. 7, Jul. 1, 1997, 9 pages.
May, S., et al., "Robust 3D-Mapping with Time-of-Flight Cameras," 2009 IEEE/RSJ International Conference on Intelligent Robots and Systems, Piscataway, NJ, USA, Oct. 10, 2009, pp. 1673-1678.
Kanhangad, V., et al., "A Unified Framework for Contactless Hand Verification," IEEE Transactions on Information Forensics and Security, IEEE, Piscataway, NJ, US., vol. 6, No. 3, Sep. 1, 2011, pp. 1014-1027.
Di Zenzo, S., et al., "Advances in Image Segmentation," Image and Vision Computing, Elsevier, Guildford, GBN, vol. 1, No. 1, Copyright Butterworth & Co Ltd., Nov. 1, 1983, pp. 196-210.
PCT/US2013/021709, International Preliminary Report on Patentability and Written Opinion, dated Sep. 12, 2013, 22 pages (WO 2013/109608).
Butail, S., et al., "Three-Dimensional Reconstruction of the Fast-Start Swimming Kinematics of Densely Schooling Fish," Journal of the Royal Society Interface, Jun. 3, 2011, retrieved from the Internet <http://www.ncbi.nlm.nih.gov/pubmed/21642367>, pp. 0, 1-12.
Kim, et al., "Development of an Orthogonal Double-Image Processing Algorithm to Measure Bubble," Department of Nuclear Engineering and Technology, Seoul National University Korea, vol. 39 No. 4, Published Jul. 6, 2007, pp. 313-326.
Kulesza, et al., "Arrangement of a Multi Stereo Visual Sensor System for a Human Activities Space," Source: Stereo Vision, Book edited by: Dr. Asim Bhatti, ISBN 978-953-7619-22-0, Copyright Nov. 2008, I-Tech, Vienna, Austria, www.intechopen.com, pp. 153-173.
Arthington, et al., "Cross-section Reconstruction During Uniaxial Loading," Measurement Science and Technology, vol. 20, No. 7, Jun. 10, 2009, Retrieved from the Internet: http:iopscience.iop.org/0957-0233/20/7/075701, pp. 1-9.
Chung, et al., "International Journal of Computer Vision: RecoveringLSHGCs and SHGCs from Stereo" [on-line], Oct. 1996 [retrieved on Apr. 10, 2014], Kluwer Academic Publishers, vol. 20, issue 1-2, Retrieved from the Internet: http://link.springer.com/article/10.1007/BF00144116#, pp. 43-58.
Bardinet, et al., "Fitting of iso-Surfaces Using Superquadrics and Free-Form Deformations" [on-line], Jun. 24-25, 1994 [retrieved Jan. 9, 2014], 1994 Proceedings of IEEE Workshop on Biomedical Image Analysis, Retrieved from the Internet: http://ieeexplore.ieee.org/xpls/abs_all.jsp?arnumber=315882&tag=1, pp. 184-193.
Dombeck, D., et al., "Optical Recording of Action Potentials with Second-Harmonic Generation Microscopy," The Journal of Neuroscience, Jan. 28, 2004, vol. 24(4): pp. 999-1003.
Chinese Patent with English Abstract, CN 1984236 (A), Jun. 20, 2007, "Method for Collecting Characteristics in Telecommunication Flow Information Video Detection," 17 pages.
Chinese Patent with English Abstract, CN 101729808 (A), Jun. 9, 2010, "Remote Control Method for Television and System for Remotely Controlling Televion by Same," 19 pages.

(56) References Cited

OTHER PUBLICATIONS

Chinese Patent with English Abstract, CN 101930610 (A), Dec. 29, 2010, "Method for Detecting Moving Object Using Adaptable Background Model," 26 pages.
Chinese Patent with English Abstract, CN 101951474 (A), Jan. 19, 2011, "Television Technology Based on Gesture Control," 7 pages.
Chinese Patent with English Abstract, CN 102201121 (A), Sep. 28, 2011, "System and Method for Detecting ARticle in Video Scene," 12 pages.
Chinese Patent with English Abstract, CN 201859393 (U), Jun. 8, 2011, "Three-Dimensional Gesture Recognition Box," 6 pages.
Chinese Patent with English Abstract, CN 201332447 (Y), Oct. 21, 2009, "Television for Controlling or Operating GMAE Through Gesture Change," 8 pages.
Germany Patent with English Abstract, DE 4201934 (A1), Jul. 29, 1993, "Interactive Computer System e.g. Mouse with Hand Gesture Controlled Operation—Has 2 or 3 Dimensional User Surface That Allows One or Two Hand Input Control of Computer," 5 pages.
Japanese Patent with English Abstract, JP 2006019526 (A), Jan. 19, 2006, "Optical Element, Package Substrate, and Device for Optical Communication," 64 pages.
Japanese Patent with English Abstract, JP 2009031939 (A), Feb. 12, 2009, "Image Processing Apparatus, Method and Program," 30 pages.
Japanese Patent with English Abstract, JP 2009037594 (A), Feb. 19, 2009, "System and Method for Constructing Three-Dimensional Image Using Camera-Based Gesture Input," 21 pages.
Japanese Patent with English Abstract, JP 2011065652 (A), Mar. 31, 2011, "Sign Based Man-Machine Interaction," 29 pages.
Japanese Patent with English Abstract, JP 4906960 (B2), Mar. 28, 2012, "Method and Apparatus for Performing Interaction Between Mobile Device and Screen," 20 pages.
Russian Patent with English Abstract, RU 2422878 (C1), Jun. 27, 2011, "Method of Controlling Television Using Multimodel Interface," 17 pages.
Taiwan Patent with English Abstract, TW 200844871 (A), Nov. 16, 2008, "Controlling Resource Access Based on User Gesturing in a 3D Captured Image Stream of the User," 75 pages.
Chinese Patent with English Abstract, CN 102236412 (A), Nov. 9, 2011, "Three Dimensional Gesture Recognition System and Vision-Based Gesture Recognition Method," 17 pages.
U.S. Appl. No. 13/742,845, Non-Final Office Action, dated Jul. 22, 2013, 21 pages (U.S. Pat. No. 8,693,731).
U.S. Appl. No. 13/742,845, Notice of Allowance, dated Dec. 5, 2013, 7 pages (U.S. Pat. No. 8,693,731).
U.S. Appl. No. 13/742,845, Issue Notification, dated Mar. 19, 2014, 1 page (U.S. Pat. No. 8,693,731).
U.S. Appl. No. 13/742,953—Office Action dated Jun. 14, 2013, 13 pages (non HBW).
U.S. Appl. No. 13/742,953—Notice of Allowance dated Nov. 4, 2013, 14 pages (non HBW).
U.S. Appl. No. 13/742,953, Issue Notification, dated Jan. 8, 2014, 1 pages (U.S. Pat. No. 8,638,989).
PCT/US2013/021713—International Preliminary Report on Patentability dated Jul. 22, 2014, 13 pages, (WO 2013/109609).
Chinese Patent with English Abstract, CN 102053702 (A), May 11, 2011, "Dynamic Gesture Control System and Method," 8 pages.
U.S. Appl. No. 13/742,953, Notice of Allowance, dated Nov. 4, 2013, 9 pages (U.S. Pat. No. 8,638,989).
Germany Patent with English Abstract, DE 102007015497 (B4), Jan. 23, 2014, "Speech Recognition Device for Use in Vehicle, Has Memory Medium for Storing Dictionary Data Structured in Tree, Where Data Contain Multiple Words as Node in Tree, and Reverse-Speech-Comparison Unit Comparing Reverse Language," 29 pages.
Korea Patent with English Abstract, KR 101092909 (B1), Dec. 6, 2011, "Gesture Interactive Hologram Display Apparatus and Method," 11 pages.
Chung, et al., "Recovering LSHGCs and SHGCs from Stereo," International Journal of Computer Vision, vol. 20, No. 1/2, 1996, pp. 43-58.

Germany Patent with English Abstract, DE 102007015495 (A1), Oct. 4, 2007, "Control object e.g. Driver's Finger, Detection Device e.g. Vehicle Navigation System, Has Illumination Section to Illuminate One Surface of Object, and Controller to Control Illumionation of Illumination and Image Recording Sections," 17 pages.
PCT/JP2008/062732, WO English Abstract with Japanese Publication of WO 2010/007662 A1, "Heat-Resistant Cushion material for Forming Press," Jan. 21, 2010, Ichikawa Co Ltd, 35 pages.
U.S. Appl. No. 14/214,605, Non Final Office Action dated Jul. 8, 2015, 38 pages.
U.S. Appl. No. 14/214,605, Final Office Action dated Jan. 29, 2016, 11 pages.
U.S. Appl. No. 14/280,018—Office Action dated Feb. 12, 2016, 38 pages.
PCT/US2013/021713—International Search Report and Written Opinion dated Sep. 11, 2013, 18 pages.
Barat et al., "Feature Correspondences From Multiple Views of Coplanar Ellipses", 2nd International Symposium on Visual Computing, Author Manuscript, 2006, 10 pages.
Cheikh et al., "Multipeople Tracking Across Multiple Cameras", International Journal on New Computer Architectures and Their Applications (IJNCAA), vol. 2, No. 1, 2012, pp. 23-33.
Davis et al., "Toward 3-D Gesture Recognition", International Journal of Pattern Recognition and Artificial Intelligence, vol. 13, No. 03, 1999, pp. 381-393.
Heikkila, J., "Accurate Camera Calibration and Feature Based 3-D Reconstruction from Monocular Image Sequences", Infotech Oulu and Department of Electrical Engineering, University of Oulu, 1997, 126 pages.
Rasmussen, Matihew K., "An Analytical Framework for the Preparation and Animation of a Virtual Mannequin forthe Purpose of Mannequin-Clothing Interaction Modeling", A Thesis Submitted in Partial Fulfillment of the Requirements for the Master of Science Degree in Civil and Environmental Engineering in the Graduate College of the University of Iowa, Dec. 2008, 98 pages.
Zenzo et al., "Advantages in Image Segmentation," Image and Vision Computing, Elsevier Guildford, GB, Nov. 1, 1983, pp. 196-210.
U.S. Appl. No. 14/214,605—Office Action dated May 3, 2016, 12 pages.
U.S. Appl. No. 14/212,485—Office Action dated Jul. 28, 2016, 44 pages.
U.S. Appl. No. 14/214,605—Final Office Action dated Sep. 8, 2016, 16 pages.
U.S. Appl. No. 14/214,605—Response to Office Action dated May 3, 2016 filed Aug. 3, 2016, 14 pages.
U.S. Appl. No. 14/280,018—Replacement Response to Feb. 12, 2016 Office Action filed Jun. 8, 2016, 16 pages.
U.S. Appl. No. 14/280,018—Notice of Allowance dated Sep. 7, 2016, 7 pages.
U.S. Appl. No. 14/280,018—Response to Feb. 12, 2016 Office Action filed May 12, 2016, 15 pages.
PCT/US2013/021709—International Search Report and Written Opinion dated Sep. 12, 2013, 22 pages.
PCT/US2013/021713—International Search Report and Written Opinion dated Sep. 11, 2013, 7 pages.
U.S. Appl. No. 13/742,845—Office Action dated Jul. 22, 2013, 19 pages.
U.S. Appl. No. 13/742,845—Notice of Allowance dated Dec. 5, 2013, 11 pages.
U.S. Appl. No. 13/742,953—Office Action dated Jun. 14, 2013, 13 pages.
U.S. Appl. No. 13/742,953—Notice of Allowance dated Nov. 4, 2013, 14 pages.
PCT/US2013/021709—International Preliminary Report on Patentability dated Jul. 22, 2014, 22 pages (WO 2013/109608).
U.S. Appl. No. 13/414,485—Office Action dated May 19, 2014, 16 pages.
U.S. Appl. No. 13/414,485—Final Office Action dated Feb. 12, 2015, 30 pages.
U.S. Appl. No. 14/106,148—Office Action dated Jul. 6, 2015, 12 pages.

(56) References Cited

OTHER PUBLICATIONS

PCT/US2013/069231—International Search Report and Written Opinion dated Mar. 13, 2014, 7 pages.
U.S. Appl. No. 13/744,810—Office Action dated Jun. 7, 2013, 15 pages.
U.S. Appl. No. 13/744,810—Final Office Action dated Dec. 16, 2013, 18 pages.
Texas Instruments, "QVGA 3D Time-of-Flight Sensor," Product Overview: OPT 8140, Dec. 2013, Texas Instruments Incorporated, 10 pages.
Texas Instruments, "4-Channel, 12-Bit, 80-MSPS ADC," VSP5324, Revised Nov. 2012, Texas Instruments Incorporated, 55 pages.
Texas Instruments, "Time-of-Flight Controller (TFC)," Product Overview; OPT9220, Jan. 2014, Texas Instruments Incorporated, 43 pages.
PCT/US2013/069231—International Preliminary Report with Written Opinion dated May 12, 2015, 8 pages.
U.S. Appl. No. 14/250,758—Office Action dated Jul. 6, 2015, 8 pages.
U.S. Appl. No. 13/414,485—Office Action dated Jul. 30, 2015, 22 pages.
U.S. Appl. No. 14/106,148—Notice of Allowance dated Dec. 2, 2015, 41 pages.
CN 2013800122765—Office Action dated Nov. 2, 2015, 17 pages.
U.S. Appl. No. 14/959,880—Notice of Allowance dated Mar. 2, 2016, 51 pages.
Matsuyama et al. "Real-Time Dynamic 3-D Object Shape Reconstruction and High-Fidelity Texture Mapping for 3-D Video," IEEE Transactions on Circuits and Systems for Video Technology, vol. 14, No. 3, Mar. 2004, pp. 357-369.
Fukui et al. "Multiple Object Tracking System with Three Level Continuous Processes" IEEE, 1992, pp. 19-27.
U.S. Appl. No. 14/250,758—Final Office Action dated Mar. 10, 2016, 10 pages.
Mendez, et al., "Importance Masks for Revealing Occluded Objects in Augmented Reality," Proceedings of the 16th ACM Symposium on Virtual Reality Software and Technology, 2 pages, ACM, 2009.
U.S. Appl. No. 13/414,485—Office Action dated Apr. 21, 2016, 24 pages.
U.S. Appl. No. 14/710,512—Notice of Allowance dated Apr. 28, 2016, 25 pages.
U.S. Appl. No. 14/959,891—Office Action dated Apr. 11, 2016, 47 pages.
U.S. Appl. No. 14/250,758—Response to Final Office Action dated Mar. 10, 2016 filed May 5, 2016, 12 pages.
U.S. Appl. No. 14/106,148—Response to Office Action dated Jul. 6, 2015 filed Nov. 6, 2015, 41 pages.
U.S. Appl. No. 14/959,880—Notice of Allowance dated Jul. 12, 2016, 22 pages.
U.S. Appl. No. 14/106,148—Notice of Allowance dated Jul. 20, 2016, 30 pages.
U.S. Appl. No. 14/959,891—Notice of Allowance dated Jul. 28, 2016, 19 pages.
JP 2014-552391—First Office Action dated Dec. 9, 2014, 6 pages.
U.S. Appl. No. 13/742,845—Response to Office Action dated Jul. 22, 2013 filed Sep. 26, 2013, 7 pages.
U.S. Appl. No. 14/959,891—Response to Office Action dated Apr. 11, 2016 filed Jun. 8, 2016, 25 pages.
DE 11 2013 000 590.5—First Office Action dated Nov. 5, 2014, 7 pages.
DE 11 2013 000 590.5—Response to First Office Action dated Nov. 5, 2014 filed Apr. 24, 2015, 1 page.
DE 11 2013 000 590.5—Second Office Action dated Apr. 29, 2015, 7 pages.
DE 11 2013 000 590.5—Response to Second Office Action dated Apr. 29, 2015 filed Sep. 16, 2015, 11 pages.
DE 11 2013 000 590.5—Third Office Action dated Sep. 28, 2015, 4 pages.
DE 11 2013 000 590.5—Response to Third Office Action dated Sep. 28, 2015 filed Dec. 14, 2015, 64 pages.
DE 11 2013 000 590.5—Notice of Allowance dated Jan. 18, 2016, 8 pages.
CN 2013800122765—Response to First Office Action dated Nov. 2, 2015 filed May 14, 2016, 14 pages.
JP 2014-552391—Response to First Office Action dated Dec. 9, 2014 filed Jun. 8, 2016, 9 pages.
JP 2014-552391—Second Office Action dated Jul. 7, 2015, 7 pages.
JP 2014-552391—Response to Second Office Action dated Jul. 7, 2015 filed Dec. 25, 2015, 4 pages.
JP 2014-552391—Third Office Action dated Jan. 26, 2016, 5 pages.
CN 2013800122765—Second Office Action dated Jul. 27, 2016, 6 pages.
U.S. Appl. No. 14/250,758—Office Action dated Sep. 8, 2016, 9 pages.
U.S. Appl. No. 14/710,499—Notice of Allowance dated Sep. 12, 2016, 28 pages.
U.S. Appl. No. 14/710,499—Office Action dated Apr. 14, 2016, 30 pages.
U.S. Appl. No. 14/710,499—Response to Office Action dated Apr. 14, 2016 filed Jul. 14, 2016, 37 pages.
CN 2013800122765—Response to Second Office Action dated Jul. 27, 2016 filed Oct. 11, 2016, 3 pages.
U.S. Appl. No. 14/154,730—Office Action dated Nov. 6, 2015, 9 pages.
U.S. Appl. No. 14/155,722—Office Action dated Nov. 20, 2015, 14 pages.
U.S. Appl. No. 14/281,817—Office Action, dated Sep. 28, 2015, 5 pages.
U.S. Appl. No. 14/262,691—Office Action dated Dec. 11, 2015, 31 pages.
U.S. Appl. No. 14/154,730—Response to Office Action dated Nov. 6, 2016, filed Feb. 4, 2016, 9 pages.
U.S. Appl. No. 14/154,730—Notice of Allowance dated May 3, 2016, 5 pages.
U.S. Appl. No. 14/474,068—Office Action dated Sep. 12, 2016, 23 pages.
U.S. Appl. No. 14/474,077—Office Action dated Jul. 26, 2016, 30 pages.
Ballan et al., "Lecture Notes Computer Science: 12th European Conference on Computer Vision: Motion Capture of Hands in Action Using Discriminative Salient Points", Oct. 7-13, 2012 [retrieved Jul. 14, 2016], Springer Berlin Heidelberg, vol. 7577, pp. 640-653. Retrieved from the Internet: <http://link.springer.com/chapter/10.1 007/978-3-642-33783-3 46>.
Cui et al., "Applications of Evolutionary Computing: Vision-Based Hand Motion Capture Using Genetic Algorithm", 2004 [retrieved Jul. 15, 2016], Springer Berlin Heidelberg, vol. 3005 of LNCS, pp. 289-300. Retrieved from the Internet: <http://link.springer.com/chapter/10.1007/978-3-540-24653-4_30>.
Delamarre et al., "Finding Pose of Hand in Video Images: A Stereo-based Approach", Apr. 14-16, 1998 [retrieved Jul. 15, 2016], Third IEEE Intern Conf on Auto Face and Gesture Recog, pp. 585-590. Retrieved from the Internet: <http://ieeexplore.ieee.org/xpl/login.jsp?tp=&arnumber=671011&url=http%3A%2F%2Fieeexplore.ieee.org%2Fxpls%2Fabs_all.jsp%3Farnumber%3D671011>.
Gorce et al., "Model-Based 3D Hand Pose Estimation from Monocular Video", Feb. 24, 2011 [retrieved Jul. 15, 2016], IEEE Transac Pattern Analysis and Machine lntell, vol. 33, Issue: 9, pp. 1793-1805, Retri Internet: <http://ieeexplore.ieee.org/xpl/logi n .jsp ?tp=&arnu mber=571 9617&u rl=http%3A %2 F%2 Fieeexplore.ieee.org%2Fxpls%2 Fabs all.jsp%3Farnumer%3D5719617>.
Guo et al., Featured Wand for 3D Interaction, Jul. 2-5, 2007 [retrieved Jul. 15, 2016], 2007 IEEE International Conference on Multimedia and Expo, pp. 2230-2233. Retrieved from the Internet: <http://ieeexplore.ieee.org/xpl/login.jsp?tp=&arnumber=4285129&tag=1&url=http%3A%2F%2Fieeexplore.ieee.org%2Fxpls%2Fabs_all.jsp%3Farnumber%3D4285129%26tag%3D1>.
Melax et al., "Dynamics Based 3D Skeletal Hand Tracking", May 29, 2013 [retrieved Jul. 14, 2016], Proceedings of Graphics Interface, 2013, pp. 63-70. Retrived from the Internet: <http://dl.acm.org/citation.cfm?id=2532141>.

(56) References Cited

OTHER PUBLICATIONS

Oka et al., "Real-Time Fingertip Tracking and Gesture Recognition", Nov./Dec. 2002 [retrieved Jul. 15, 2016], IEEE Computer Graphics and Applications, vol. 22, Issue: 6, pp. 64-71. Retrieved from the Internet: <http://ieeexplore.ieee.org/xpI/login.jsp?tp=&arnumber=1046630&url=http%3A%2F%2Fieeexplore.ieee.org%2Fxpls%2Fabsall.jsp%3Farnumber%3D1046630>.

Schlattmann et al., "Markerless 4 gestures 6 DOF real-time visual tracking of the human hand with automatic initialization", 2007 [retrieved Jul. 15, 2016], Eurographics 2007, vol. 26, No. 3, 10 pages, Retrieved from the Internet: <http://cg.cs.uni-bonn.de/aigaion2root/attachments/schlattmann-2007-markerless.pdf>.

Wang et al., "Tracking of Deformable Hand in Real Time as Continuous Input for Gesture-based Interaction", Jan. 28, 2007 [retrieved Jul. 15, 2016], Proceedings of the 12th International Conference on Intelligent User Interfaces, pp. 235-242. Retrieved fromthe Internet: <http://dl.acm.org/citation.cfm?id=1216338>.

Zhao et al., "Combining Marker-Based Mocap and RGB-D Camera for Acquiring High-Fidelity Hand Motion Data", Jul. 29, 2012 [retrieved Jul. 15, 2016], Proceedings of the ACM SIGGRAPH/Eurographics Symposium on Computer Animation, pp. 33-42, Retrieved from the Internet: <http://dl.acm.org/citation.cfm?id=2422363>.

PCT/US2014/013012—International Search Report and Written Opinion dated May 14, 2014, published as WO 2014116991, 12 pages.

U.S. Appl. No. 14/151,394—Office Action dated Oct. 22, 2015, 26 pgs.

U.S. Appl. No. 14/506,596—Notice of Allowance dated Nov. 9, 2016, 15 pages.

U.S. Appl. No. 14/151,394—Office Action dated Apr. 5, 2016, 26 pages.

U.S. Appl. No. 14/151,394—Office Action dated Sep. 30, 2016, 40 pages.

U.S. Appl. No. 14/214,605—Advisory Action dated Dec. 21, 2016, 5 pages.

U.S. Appl. No. 14/214,605—Response to Final Office Action dated Sep. 8, 2016 filed Dec. 7, 2016, 16 pages.

U.S. Appl. No. 14/214,605—Response to Final Office Action dated Jan. 29, 2016 filed Apr. 1, 2016, 17 pages.

U.S. Appl. No. 14/214,605—Response to Non Final Office Action dated Jul. 8, 2015 filed Dec. 1, 2015, 16 pages.

U.S. Appl. No. 14/212,485—Response to Non-Final Office Action dated Jul. 28, 2016 filed Dec. 28, 2016, 16 pages.

U.S. Appl. No. 14/214,605, Notice of Allowance dated Mar. 6, 2017, 20 pages.

U.S. Appl. No. 14/212,485—Final Office Action dated Mar. 22, 2017, 9 pages.

U.S. Appl. No. 15/392,920—Notice of Allowance dated Jun. 7, 2017, 89 pages.

\* cited by examiner

Object 502

Object 206

DETERMINING POSITIONAL INFORMATION OF AN OBJECT IN SPACE

RELATED APPLICATIONS

This application is a continuation of U.S. Ser. No. 15/625,856, entitled DETERMINING POSITIONAL INFORMATION OF AN OBJECT IN SPACE, filed 16 Jun. 2017, now U.S. Pat. No. 9,927,522, issued 27 Mar. 2018, which is a continuation of U.S. Ser. No. 14/214,605, entitled, "DETERMINING POSITIONAL INFORMATION OF AN OBJECT IN SPACE," filed 14 Mar. 2014, now U.S. Pat. No. 9,702,977, issued 11 Jul. 2017 and which claims the benefit of three U.S. provisional Patent Applications, including: No. 61/801,479, entitled, "DETERMINING POSITIONAL INFORMATION FOR AN OBJECT IN SPACE," filed 15 Mar. 2013; No. 61/792,025, entitled, "DETERMINING POSITIONAL INFORMATION FOR AN OBJECT IN SPACE," filed 15 Mar. 2013; and No. 61/800,327, entitled, "DETERMINING POSITIONAL INFORMATION FOR AN OBJECT IN SPACE," filed 15 Mar. 2013. The priority applications are hereby incorporated by reference for all purposes.

FIELD OF THE TECHNOLOGY DISCLOSED

Implementations of the technology disclosed generally relate to determining positional information and, more particularly, to determining position and/or distance and/or depth of an object or features of an object surface in space.

BACKGROUND

One way to measure the distance to a remote object is to broadcast a wave (e.g., a sound wave, for example), start a timer and wait to capture the portion of the wave reflected by the object. By measuring the time the wave takes to make the round-trip distance (and by knowing the propagation rate of the wave), the distance to the object can be calculated. The position of the object can be inferred (e.g., via triangulation) from the reflected wave. This method of distance and position determination can work over large distances when precision beyond a few meters is not required.

Unfortunately, such conventional techniques do not work well for more precise determinations and/or determinations made over shorter distances. The accuracy of the measurement depends heavily on recording the precise times of broadcast and capture, which is especially difficult for very fast-moving waves (e.g., light waves). Further, one or both of the angles between wave emitter, wave sensor and object are difficult or impossible to determine, and the transit time of the wave can be very difficult to measure. The result is that the distances computed using conventional techniques can be very inaccurate. A need therefore exists for better methods for determining the distance and position of an object.

SUMMARY

The technology disclosed relates to determining positional information of an object in a field of view. In particular, it relates to calculating a distance of the object from a reference such as a sensor including scanning the field of view by selectively illuminating directionally oriented light sources that have overlapping fields of illumination and measuring one or more differences in property of returning light emitted from the light sources and reflected from the object. In some implementations, the property is intensity. In other implementations, the property is phase difference.

The technology disclosed also relates to finding an object in a region of space. In particular, it relates to scanning the region of space with directionally controllable illumination, determining a difference in a property of the illumination received for two or more points in the scanning, and determining positional information of the object based at least in part upon the points in the scanning corresponding to the difference in the property. In some implementations, the property is intensity. In other implementations, the property is phase difference.

Aspects of the systems and methods described herein also provide for determining positional information (e.g., location, distance, and/or depth) for at least a portion of a target object within a field of view. Among other aspects, implementations can enable objects and/or features of an object surface to be automatically (e.g. programmatically) determined using positional information in conjunction with receiving input, commands, communications and/or other user-machine interfacing, gathering information about objects, events and/or actions existing or occurring within an area being explored, monitored, or controlled, and/or combinations thereof.

In one implementation, a method includes emitting light from a plurality of light sources mounted on a surface or surfaces having a non-planar (e.g., curved, polygonal, or arc-based) shape and/or mounted to a planar surface or surfaces and directed at differing angles. Light sources comprising a transmitter can be integrally mounted to a common structure and/or non-integrally distributed over a plurality of structures and/or incorporated into other devices and/or combinations thereof. Light sources can be selectively illuminated (e.g., one-at-a-time, in groups, sequentially or according to some pattern) to advantageously "scan" a field of view. The emitted light reflects from an object in a field of view, enabling the reflected light to be captured by a sensor (e.g., video cameras based on CCD arrays and/or CMOS arrays, arrays constructed of photodiodes, phototransistors, photovoltaic devices, and/or other types of photo-detector devices capable of converting light into current or voltage, and/or sensors comprising single elements of such devices coupled to raster or other scanning hardware and/or software, and/or combinations thereof). Reflected light originating from each light source can have different properties (e.g., intensity, phase, or the like) as captured by the sensor. An analyzer (e.g., computer, specialized circuitry, microcontroller, custom silicon, and/or combinations thereof) can detect the differences in properties and, based at least in part thereon, can determine positional information (e.g., location, distance, and/or depth) for at least a portion of the object.

Variants exist, however; in implementations, depth can be determined from stereoscopic differences in the reflected light obtained from scanning the field of view along a single plane approximately co-planar to the direction of the light emitted from the light sources and/or from differences in the reflected light obtained from scanning the field of view along two or more intersecting planes, each approximately co-planar to the direction of the light illuminated by different sets of light sources arranged integrally or non-integrally to provide for cross-scanning of the field of view, and/or combinations thereof.

According to another aspect, differences in the number of light sources illuminated can determine accuracy. In one method implementation, a coarse scan can be achieved in which some light sources can be skipped when situations call for less accuracy, i.e., light is transmitted from only a subset of the light sources to provide a low-resolution data set of distance to an object. A more accurate fine-grained scan can be achieved by selecting a relatively larger number of light sources to illuminate thereby providing more data leading to greater accuracy.

According to a further aspect, an implementation can conduct a relatively coarse scan of a field of view to locate object(s) and then follow up with a relatively fine-grained scan in a subsection of the field of view in which the object has been located. The fine-grained scan can enable features of objects to be closely identified, thereby enabling different objects (e.g., hands of different human users, different pets walking across the field of view, etc.) to be distinguished.

In another implementation, the light sources can be illuminated to different levels of brightness to provide differences in properties for the light illuminating the target object. In another implementation, light sources can be illuminated to different frequencies to provide differences in color properties for the light illuminating the target object. In an implementation, scans can be completed using light driven to achieve one set of properties, the resulting image data analyzed, a change in light property can be effected, and then a subsequent scan can be effected using the new light property. In another implementation, light source frequencies can be selected from different portions of the electromagnetic spectrum (e.g., ultraviolet, visible, infrared and/or combinations thereof) to illuminate the target object during scan, thereby providing opportunities to capture additional data.

In a yet further implementation, a method provides for determining distance to an object in space. The method can include receiving at a sensor light defining at least a portion of an object, the light originating from a plurality of light sources directed at different angles and of known geometry. The method can also include determining differences in phase for the light received from at least two of light sources. The method can also include determining a distance to the object based at least in part on the differences in the phase.

In a still yet further implementation, a system provides for determining a distance to an object in space. The system can include a plurality of light sources mounted on surface and directed at different angles. A sensor to capture light transmitted from the plurality of light sources and reflected from an object in a field of view of the sensor can also be part of the system. The system can also include a controller configured to determine differences in phases of the captured light and compute a distance to the object based at least in part on the phases.

In another aspect, implementations incorporating low resolution time-measurement based approaches can be used to conduct a relatively coarse scan of a field of view to locate object(s) and then follow up with a relatively fine-grained scan in a subsection of the field of view in which the object has been located.

In a yet further aspect, a set of illumination sources can be disposed to provide illumination to a field of view such that a plurality of cameras (and/or other sensors based upon light sensitive elements, i.e., pixels) disposed to be able to receive light from the illumination sources can provide image information based upon the changing illumination when different ones of the illumination sources are activated. Differences in light properties (e.g., phase, intensity, wavelengths and/or combinations thereof) from the illumination sources will be detected by each camera (or other sensor) and therefore will appear in each of the images provided by the cameras (or other sensor). Correlating corresponding changes in light properties the different images enables determining correspondence between the pixels in images of the camera(s). Such implementations can provide for improved robustness to techniques for correlating objects viewed by multiple cameras (or other light sensors).

Reference throughout this specification to "one example," "an example," "one implementation," or "an implementation" means that a particular feature, structure, or characteristic described in connection with the example is included in at least one example of the present technology. Thus, the occurrences of the phrases "in one example," "in an example," "one implementation," or "an implementation" in various places throughout this specification are not necessarily all referring to the same example. Furthermore, the particular features, structures, routines, actions, or characteristics can be combined in any suitable manner in one or more examples of the technology. The headings provided herein are for convenience only and are not intended to limit or interpret the scope or meaning of the claimed technology.

Advantageously, these and other aspects enable machines, computers and/or other types of intelligent devices, and/or other types of automata to obtain information about objects, events, actions, and/or users employing gestures, signals, and/or other motions conveying meaning and/or combinations thereof. These and other advantages and features of the implementations herein described, will become more apparent through reference to the following description, the accompanying drawings, and the claims. Furthermore, it is to be understood that the features of the various implementations described herein are not mutually exclusive and can exist in various combinations and permutations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

Described herein are various implementations of methods and systems for determining the distance, position and/or depth of an object in space. Implementations can provide improved accuracy in positional and/or depth information capable of supporting object or object surface recognition, object change, event or action recognition and/or combinations thereof. An implementation provides for determining distance, position and/or depth of target object(s) relative to a reference (e.g., light transmitter and/or sensor). (The term "light," as used herein, means electromagnetic radiation of any wavelength or wavelengths. For the purposes described herein, light is typically in the infrared, visible or ultraviolet spectral regions.)

Figure 1:
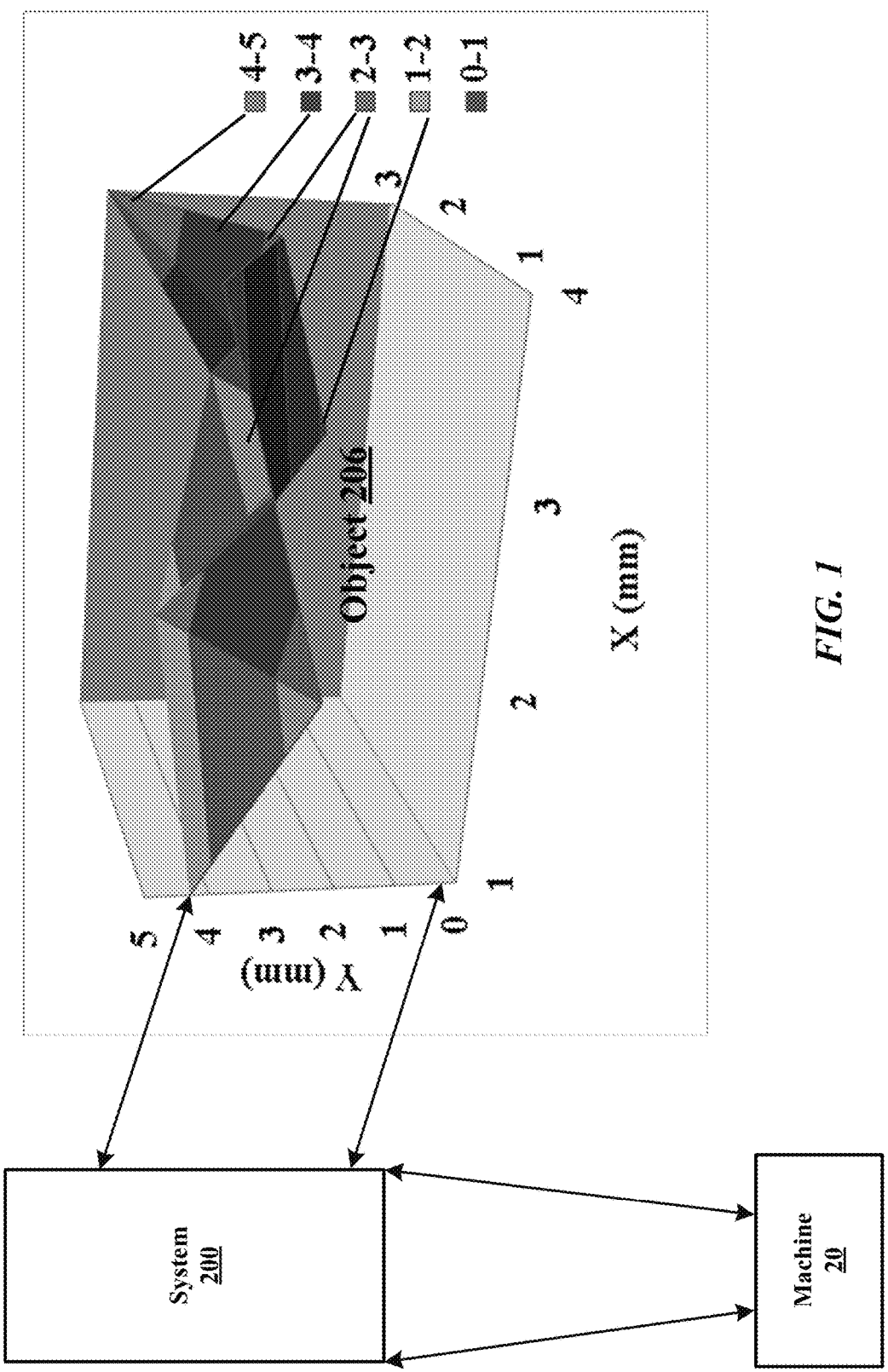
FIG. 1 is a simplified block diagram of an exemplary task environment to which select implementations of the technology disclosed can be directed.

FIG. 1 is a simplified block diagram of an exemplary task environment 100 to which select implementations of the technology disclosed can be directed. FIG. 1 shows a task environment in which objects exist, and/or actions occur, and machines can determine information about them. An object 206 can have a complex surface and/or can change in shape or position over time. Machine 20 can obtain positional and depth information about the object 206 using system 200, a plurality of integral, non-integral and/or communicatively coupled elements, configurable into a more distributed or more integrated manner employing techniques described herein. While object 206 can be any of a wide variety of objects, in an implementation, object 206 can include at least a portion of a user and/or operator of machine 20. For example, users, represented by object 206, can employ gestures, signals, and/or other motions of all or a portion of the user's body to convey to machine 20 information, commands, communications, and/or combinations thereof.

Figure 2A:
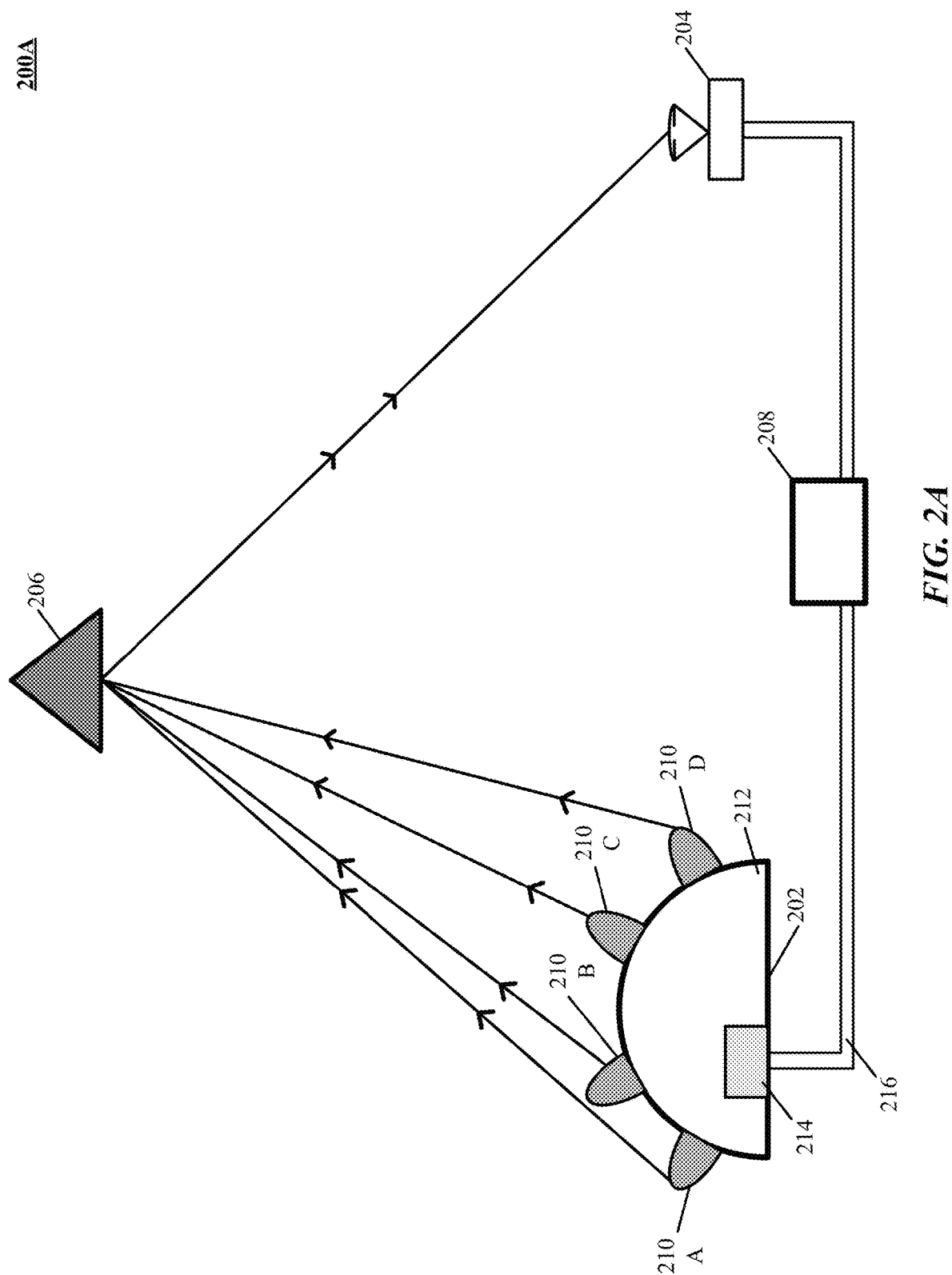
FIG. 2A is a simplified block diagram of an exemplary system for computing a distance to an object in accordance with an implementation of the technology disclosed.

FIG. 2A is a simplified block diagram 200A of an exemplary system for computing a distance to an object in accordance with an implementation of the technology disclosed. As illustrated in FIG. 2A, an exemplary system 200 includes a transmitter 202 that emits light, a sensor 204 capable of receiving a portion of the emitted light as reflected from an object 206 and converting the resulting images to electrical signals, and a computer 208 coupled to transmitter 202 and sensor 204. While dedicated circuitry, FPGAs, and other controller implementations can be realized, in an implementation, a computer 208 is implemented using a processor executing instructions stored in a memory to determine the position of the object 206 (i.e., its distance from the transmitter 202 and/or receiver 204). Some implementations can determine positional information within approximately millimeters or micrometers of accuracy; other implementations can determine positional information within approximately centimeters of accuracy, as applications of the implementations require. The technology disclosed is not, however, limited to any particular accuracy, and as described below, certain attributes of the technology disclosed can be adjusted to increase or decrease accuracy. In various implementations, as described in greater detail below, a plurality of light sources 210 on the transmitter 208 flash on-and-off at periodic—or other—intervals. The sensor 204 receives the reflection of this light from the object 206 and, based at least in part upon the differences in path that the received light travels from the plurality of light sources 210 and a known geometric relationship between the light sources 210, the computer 208 calculates the distance to the object 206.

Figure 2B:
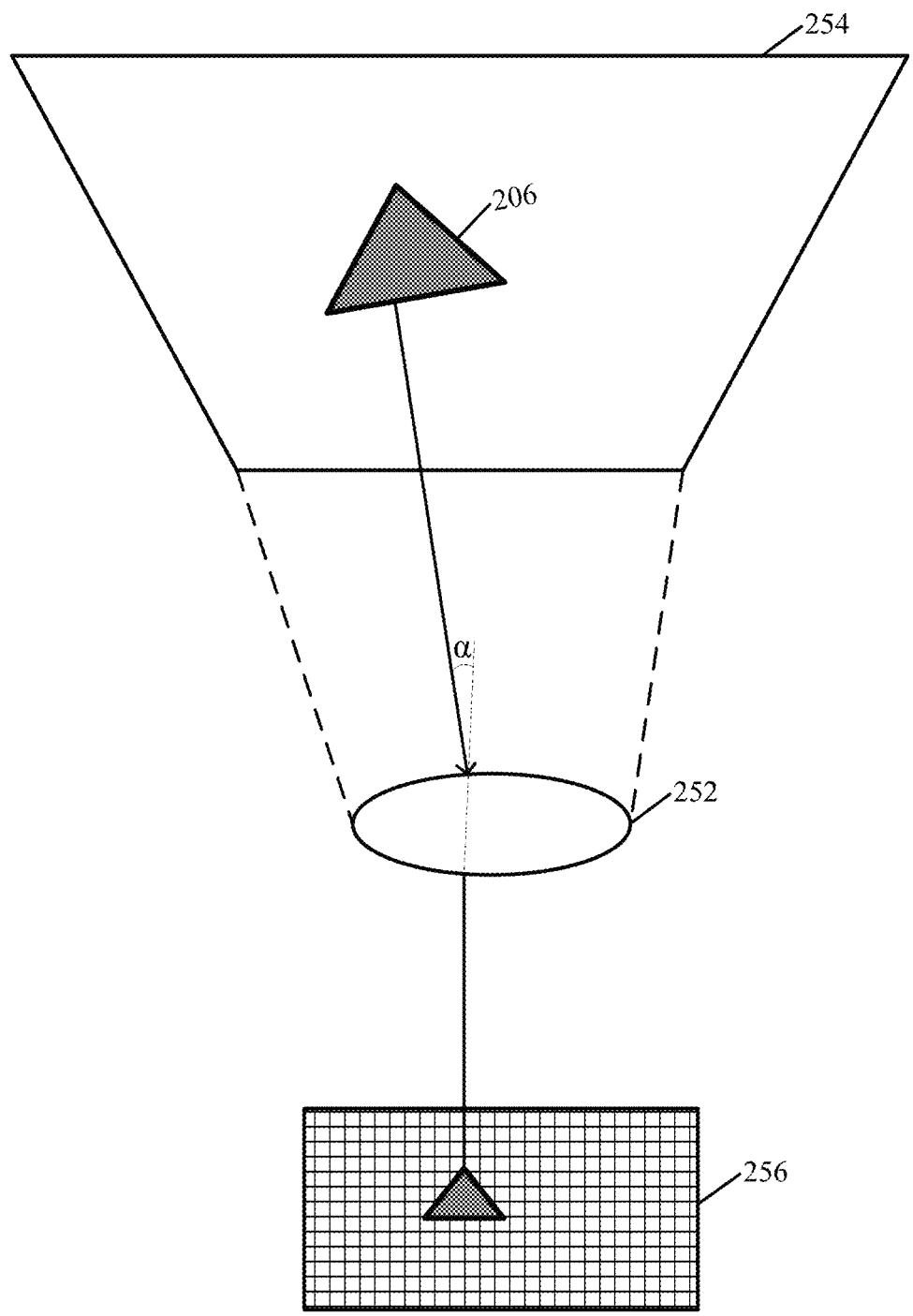
FIG. 2B is an illustration of a sensor capturing a light ray reflected from an object in a field of view in accordance with an implementation of the technology disclosed.

The sensor 204 detects the intensity and angle of incoming light rays. In one implementation, the sensor 204 includes a lens and a charge-coupled device ("CCD"), such as the ones found in digital still or video cameras. FIG. 2B is an illustration 200B of a sensor capturing a light ray reflected from an object in a field of view in accordance with an implementation of the technology disclosed. As shown in FIG. 2B, the lens 252 focuses light received from a field of view 254 that includes the object 206 onto the CCD 256, which is divided into a plurality of sensor areas corresponding to pixels in an image produced thereby. The intensity (and/or other information, such as color) of the light striking each pixel of the CCD can be read out to the computer 208. In one implementation, the sensor 204 captures the light data as a series of image frames that are read out to the computer 208 at, for example, 60 or 120 frames per second. The CCD can be of any size, pixel count, or frame rate, however, and the technology disclosed is not limited to any particular type of CCD. Furthermore, any type of sensor (e.g., a CMOS sensor) capable of detecting the angle and intensity of incoming light is within the scope of the technology disclosed, which is not limited to only CCD-based sensors; references herein to CCDs are solely for convenience.

The angle of the incoming light relative to a normal line through lens 252 that strikes each pixel of the CCD (or other image sensor) can be inferred by the computer 208. The lens 252 focuses incoming light onto the CCD 256 in accordance with its shape; each pixel of the CCD 256 corresponds to a point and angle on the lens 252 at which the incoming light is received. Light striking the lens 252 from the object 206, for example, is mapped to a particular pixel (or set of pixels) on the CCD 256. The computer 208 can include a look-up table (or similar data structure) that maps each pixel of the image read from the CCD 256 to a corresponding incoming angle of light. The look-up table can be predetermined (based on the known properties of the lens, such as the size of its field of view) or generated dynamically from data read from the CCD. In one implementation, a test-pattern image is captured by the CCD to generate the look-up table and/or to calibrate the predetermined look-up table (to account for, for example, imperfections in the lens). Other methods of calibrating the lens 252 are also within the scope of the technology disclosed.

In one implementation, the lens 252 can be calibrated by capturing, on the CCD 256, a plurality of images of an object 206 having a flat surface (such as, for example, a computer display, mirror, or wall). The relative position between the lens 252 and the flat surface of the object 206 can be varied for each captured image by, for example, movement of the lens 252 and/or the object 206. The movement can include an increase or decrease in the distance between the lens 252 and the object 206, a rotation of the lens 252 and/or object 206 on any axis, and/or lateral movement of the lens 252 and/or object 206. Each captured image can be analyzed to determine a distance from the lens 252 to one or more points on the flat surface of the object 206; the determination of the distance(s) can be performed in accordance with the implementations of the technology disclosed described herein and/or other methods known in the art. The distances associated with each image are compared across all of the images; any discrepancies or deviations in the measured distances can be used to determine imperfections or defects in the lens 252. A deviation that changes its position in the captured images as the relative positions of the lens 252 and object 206 change can be deemed to be an inconsistency in the flat surface of the object 206; a deviation that does not change its position in the captured images as the relative positions of the lens 252 and object 206 change can be deemed to be an imperfection in the lens 252. The position of each imperfection, and the degree of the imperfection, can be used to construct the look-up table discussed above.

Figure 2C:
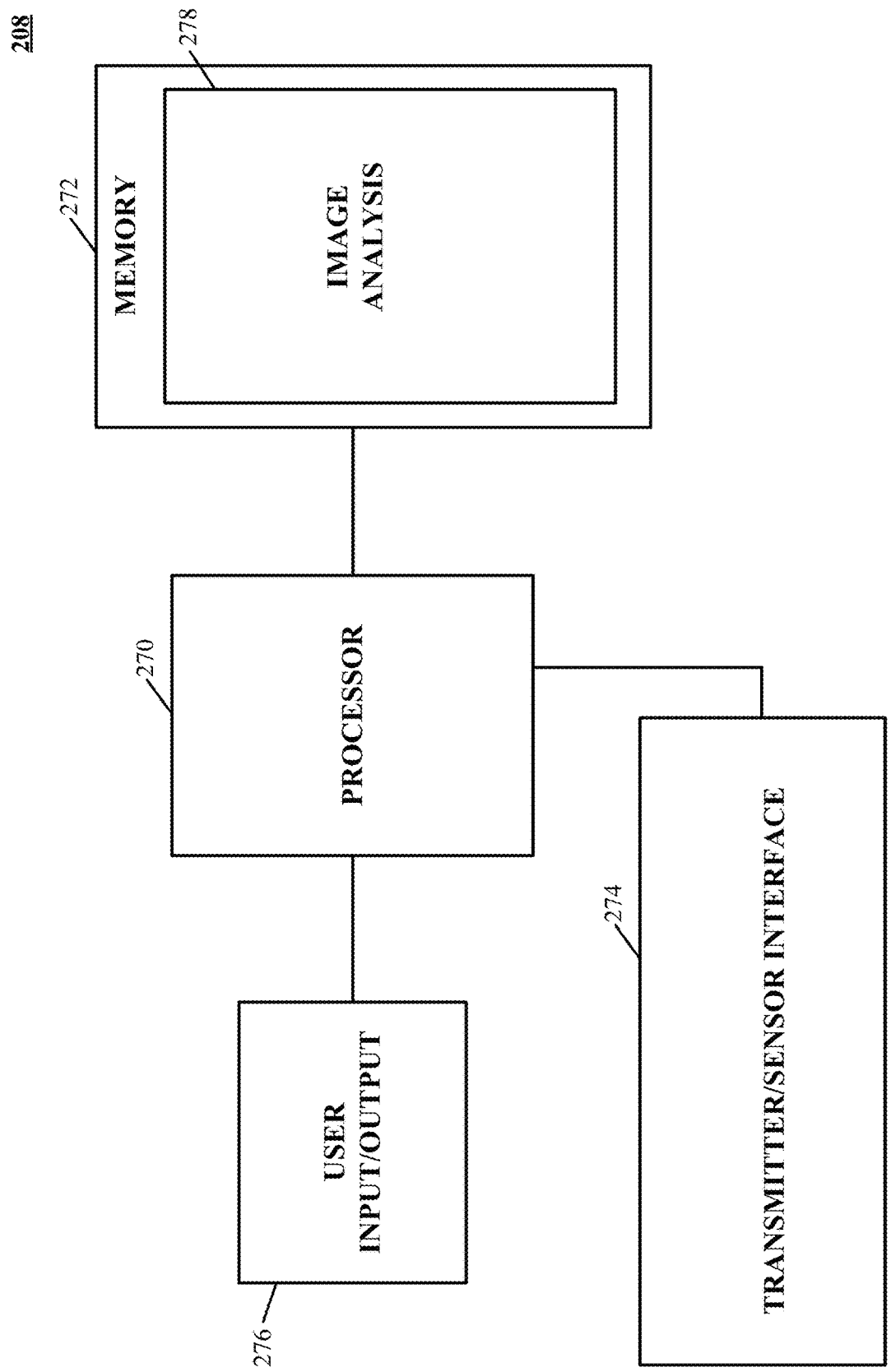
FIG. 2C is a simplified block diagram of a computer for determining a distance to an object in accordance with an implementation of the technology disclosed.

FIG. 2C is a simplified block diagram of a computer for determining a distance to an object in accordance with an implementation of the technology disclosed. As shown in FIG. 2C the computer 208 can include a processor 270, a memory 272, a transmitter/sensor interface 274, and/or user input/output device(s) 276 (including but not limited to, for example, a display, speakers, a keyboard, and a mouse). The computer 208 can be a personal computer, tablet computer, or similar stand-alone device or an application-specific system designed or selected for use with the sensor 204 (such as a digital-signal processor and/or application-specific integrated circuit). In one implementation, some or all of the functionality of the computer 208 is integrated into structure 212 of the transmitter 202 and/or incorporated into—or affixed to—sensor 204. The computer 208 can include digital circuitry (e.g., a computer processor and memory) and/or analog circuitry (e.g., an analog phase detector, and/or an analog peak detector).

The memory 272 can be used to store instructions to be executed by processor 270 as well as input and/or output data associated with execution of the instructions. In particular, memory 272 contains instructions, conceptually illustrated as one or more modules that control the operation of processor 270 and its interaction with the other hardware components. For example, the memory 272 can contain an image analysis module 278 for analyzing image data received from the sensor 204 and computing a distance to an object 206. An operating system directs the execution of low-level, basic system functions such as memory allocation, file management and operation of mass storage devices. The operating system can be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION or OPEN-ACTION operating system, iOS, Android or other mobile operating systems, or another operating system platform.

The computer 270 can also include other removable/non-removable, volatile/nonvolatile computer storage media, such as a solid-state or magnetic hard disk, an optical drive, flash memory, random-access memory, read-only memory, or any other similar type of storage medium. The processor 270 can be a general-purpose microprocessor, microcontroller, digital-signal processor, or any other type of computational engine. The transmitter/sensor interface 274 can include hardware and/or software that enable communication between the computer 270 and the transmitter 202 and/or sensor 204. For example, the transmitter/sensor interface 274 can include one or more data ports (such as USB ports) to which devices can be connected, as well as hardware and/or software signal processors to modify sent or received data signals (e.g., to reduce noise or reformat data). In some implementations, the interface 274 also transmits control signals to, e.g., activate or deactivate attached devices, to control camera settings (frame rate, image quality, sensitivity, zoom level, etc.), or the like. Such signals can be transmitted, e.g., in response to control signals from processor 270, which can in turn be generated in response to user input or other detected events.

Again with reference to FIG. 2A, the transmitter 202 includes a plurality of light sources 210 mounted on a structure 212. The light sources 210 can be light-emitting diodes ("LEDs"), incandescent lights, halogen lights, laser-light sources, or any other type of light-emitting device, and/or device for emitting radiant energy. While FIG. 2A illustrates four light sources 210 for clarity, the technology disclosed is not limited to any particular number of light sources 210. The light emitted by the light sources 210 can be visible or invisible to humans; the light can be, for example, white light or infrared light. In one implementation, the type of light (i.e., the wavelength of the light) is chosen based on the uniqueness of the wavelength in the environment viewed to thereby more readily detect the reflection of the light at the sensor 204.

The transmitter 202 can include a driver circuit 214 for powering and controlling the light sources 210; the light sources can alternatively or in addition be powered and/or controlled via a network link 216 by the computer 208. The structure 212 can be made of any suitable material, such as plastic or metal. Each light source 210 shares a defined geometrical relationship with the other light sources 210 by being mounted on the rigid structure 212. In one implementation, the light sources 210 each share a common radius with respect to a central point of origin, and can have equal angular spacing. In other implementations, the radii of the light sources 210 with respect to the central point of origin can vary in accordance with other geometric relationships; for example, the light sources 210 can be disposed on the structure 212 such that their position conforms to a parabolic or hyperbolic shape.

Figure 3A:
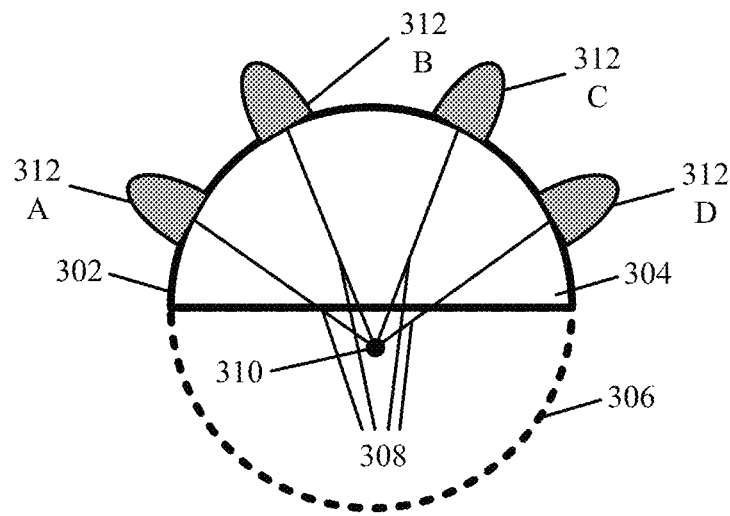
FIGS. 3A and 3B are illustrations of exemplary transmitter configurations in accordance with implementations of the technology disclosed.
Figure 3B:
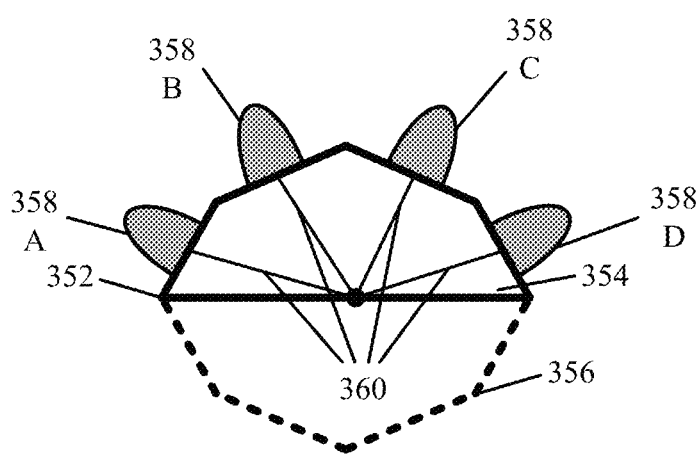

FIGS. 3A and 3B illustrate exemplary transmitter configurations in accordance with implementations of the technology disclosed. In FIG. 3A, transmitter configuration 300 includes a face 302 of the transmitter 304, which comprises a non-coplanar surface (i.e., a surface comprising points that do not all lie in the same plane). In the illustrated implementation, the non-coplanar surface is an arc (i.e., a portion of a circle 306) having a radius 308 with respect to a central point 310; each light source 312, because it is mounted on the surface 302, therefore shares the same radius 308. In other implementations, such as the implementation shown in FIG. 3B, in which transmitter configuration 350 includes a face 352 of the transmitter 354, which comprises a multi-faceted polygon 356 (i.e., an "N-gon" having N sides/faces). The light sources 356 can be mounted at points in the center of each face of the N-gon 356; thus mounted, the light sources 358 are equidistant from a central point in accordance with a radius 360. In other implementations, the N-gon has any number of sides; the light sources 356 can alternatively be mounted at different points on the faces of the N-gon. The technology disclosed is not limited to only the implementations shown in FIGS. 3A and 3B; any arrangement of a plurality of light sources wherein the light sources have a defined geometric relationship to each other, such as being mounted on a surface of a geometric shape or any other such relationship, is within the scope of the technology disclosed. Furthermore, while the implementations described herein illustrate the light sources 356 mounted on convex surfaces (e.g., an arc or N-gon), one of skill in the art will realize that the light sources 356 can alternatively or in addition be mounted on concave surfaces (on, e.g., the concave surface of a parabolic antenna) and/or mounted to a planar surface but directed (i.e., by mounting and/or by use of optical components) at differing angles.

Figure 4A:
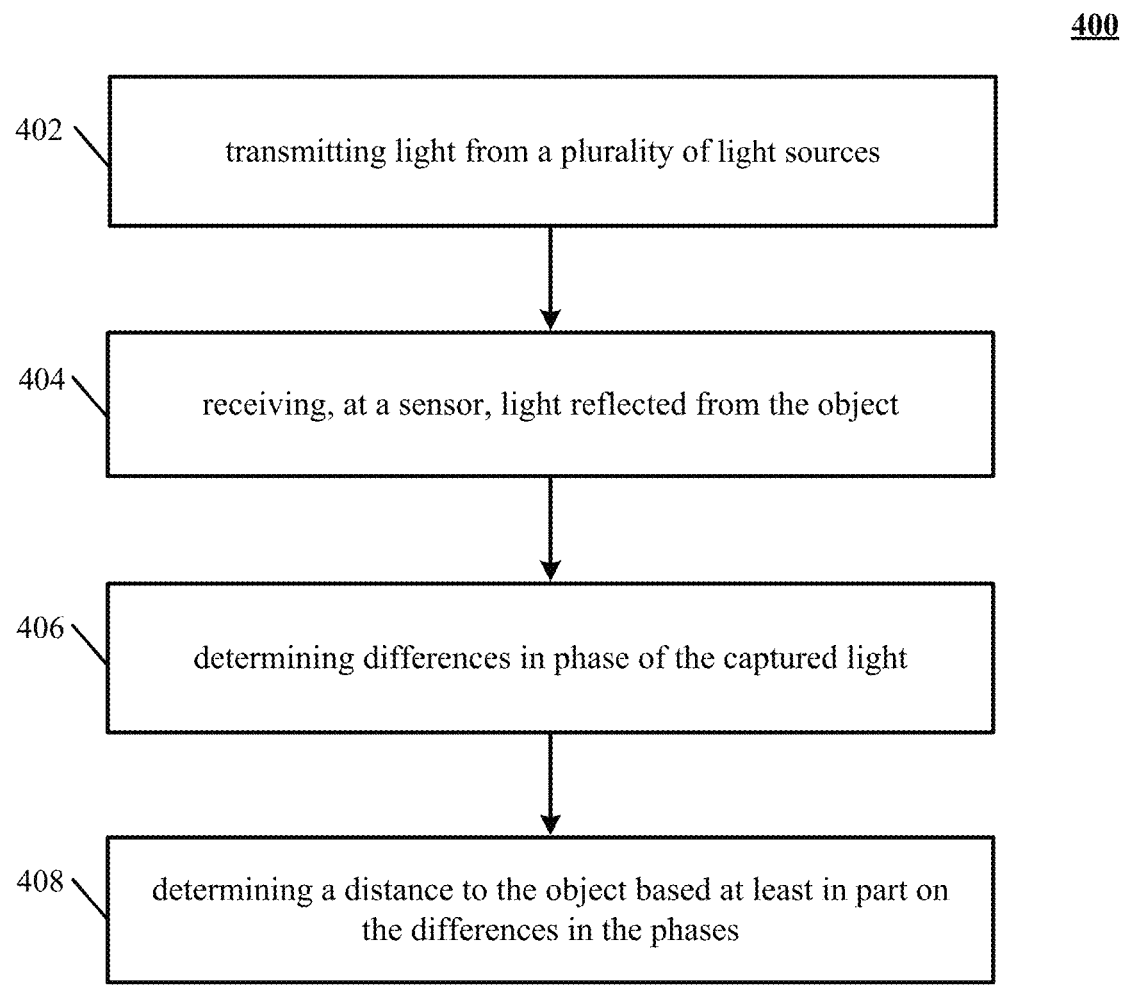
FIG. 4A is a simplified flow chart illustrating a process for determining a distance to an object in space according to an implementation of the technology disclosed.

FIG. 4A is a simplified flow chart illustrating a process for determining a distance to an object in space according to an implementation of the technology disclosed. As shown in FIG. 4A, flowchart 400 includes transmitting light from a plurality of light sources (402). Each light source can be capable of being disposed and/or directed at a different geometric position (e.g., position, distance, and/or angle, etc.) relative to an object. Referring again also to FIG. 2A, the light sources 210 can be configured to change their levels of brightness periodically. In one implementation, a first light source 210 is illuminated or "on" while the rest are un-illuminated or "off"; the driver circuit 214 and/or the computer 208 then shuts the first light source 210 off and turns on one of the previously off sources 210. Some or all of the rest of the light sources 210 are switched on, one at a time, for example, until each light source 210 has been illuminated and then switched off, at which point the first light source 210 is illuminated again. The light sources 210 can be illuminated in any pattern or sequence; in one implementation, the light sources 210 are illuminated left-to-right and then left-to-right (referring to the labels in FIG. 2A, ABCD ABCD). In another implementation, the light sources 210 are illuminated left-to-right-to-left (referring again to the labels in FIG. 2A, ABCDCBA). As used herein, the directions "left" and "right" refer to the relative positions of the light sources 210 on the transmitter 202 and do not imply any particular orientation of the transmitter 202. In another implementation of the technology disclosed, the transmitter 202 is oriented such that the light sources 210 are vertically arranged and are thus illuminated up and down; the transmitter 202 can alternatively be oriented at any angle; and/or light sources 210 can be populated along more than one dimension along the surface of transmitter 202 (e.g., right to left and top to bottom, orthogonally or at other angles of intersection).

The manner and level of illumination of each light source 210 can vary in accordance with implementations of the technology disclosed. In one implementation, each light source 210 is switched fully on to a maximum or high level of brightness and then switched off to a minimum or low level of brightness. Each light source 210 is thus switched on and off before a next light source 210 is switched on; there is no (or negligible) overlap between the illumination period of a first light source 210 and a second light source 210. As explained in greater detail below, the overall accuracy of the system 200 in this implementation depends at least in part upon the number of light sources 210. In another implementation, the light sources 210 are illuminated to different levels of brightness; for example, each light source 210 can be first switched to a low dimming setting, then a medium dimming setting, then a full brightness setting, then back down to a medium dimming setting and a low dimming setting. In this implementation, a next light source 210 can begin illumination (at, e.g., a low dimming setting) while a first light source 210 is still illuminated. Only one light source 210 can be configured at a maximum setting at any given time, however. Any method of increasing and decreasing the dimming level of each light source 210 is within the scope of the technology disclosed; the illumination level can be linear, logarithmic, quadratic, exponential, and/or Gaussian, and/or combinations thereof for example. In these implementations, an overall accuracy of the system 200 can further depend at least in part upon the number of discrete dimming levels to which each light source 210 is illuminated. In one implementation, the accuracy can further depend at least in part upon the frequency that the light sources 210 are illuminated.

Figure 4B:
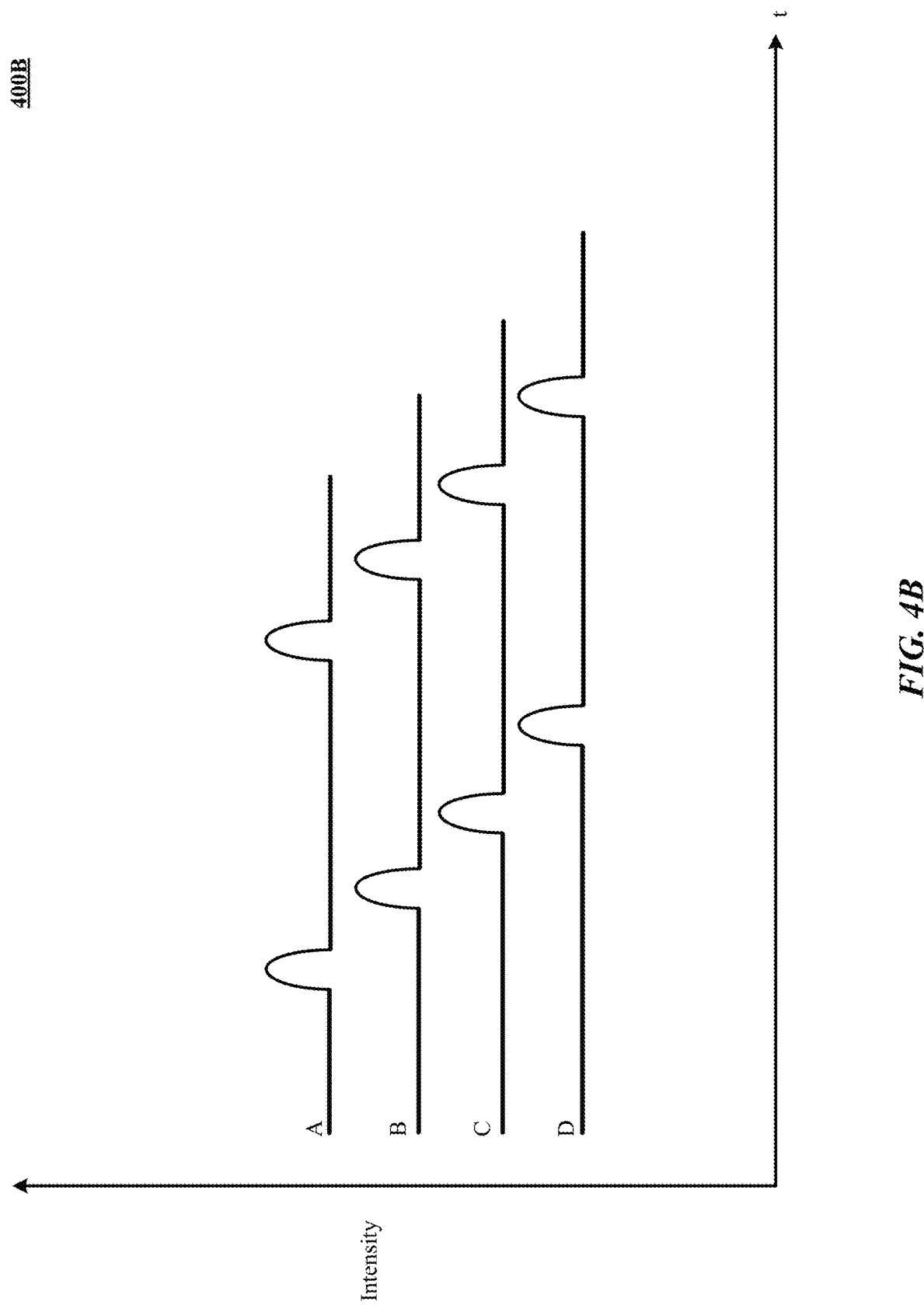
FIG. 4B is a graph of variations in intensity between light transmitted from the light sources and received by the sensor.
Figure 4C:
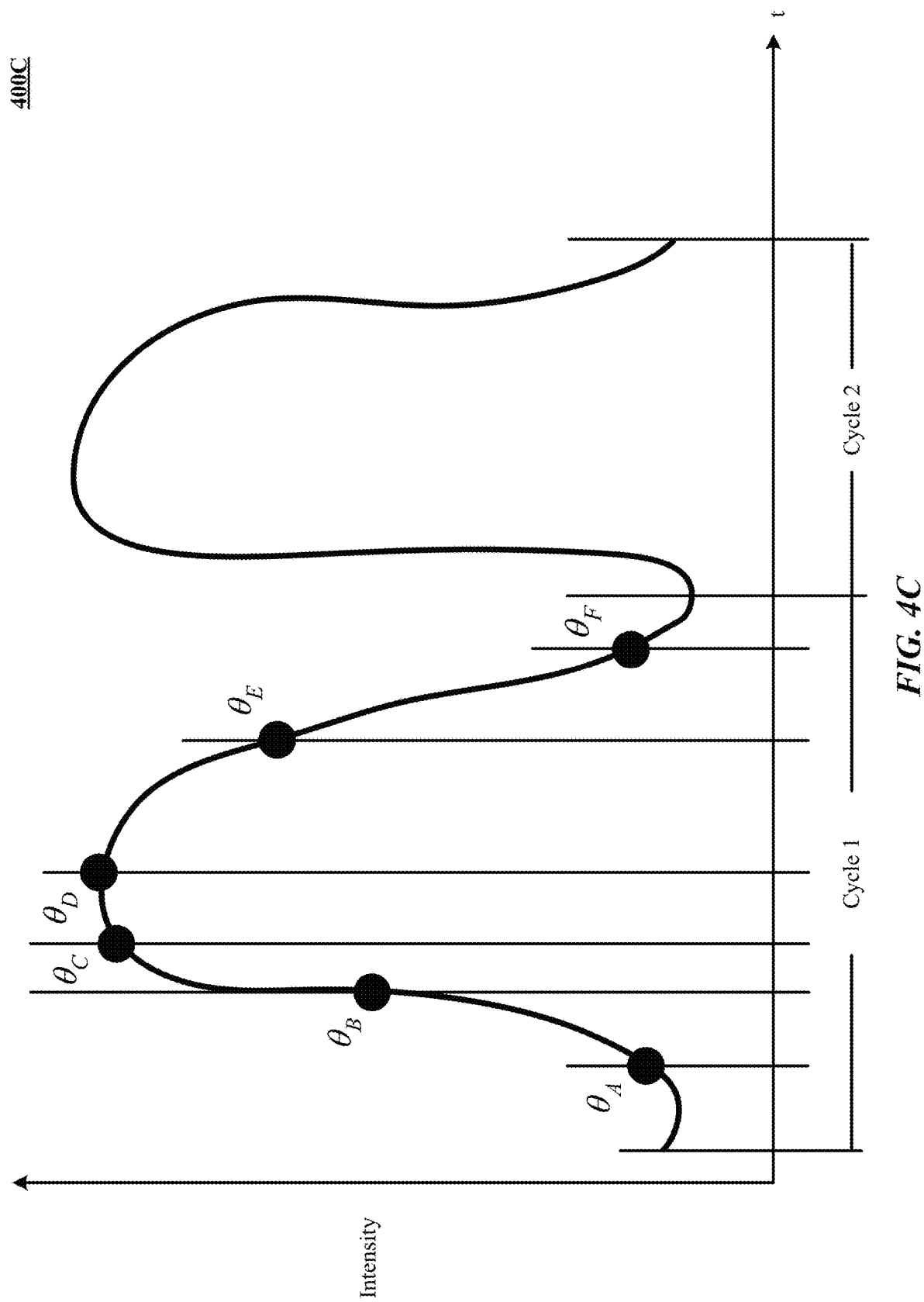
FIG. 4C illustrates exemplary brightness curves of different light sources.
Figure 5A:
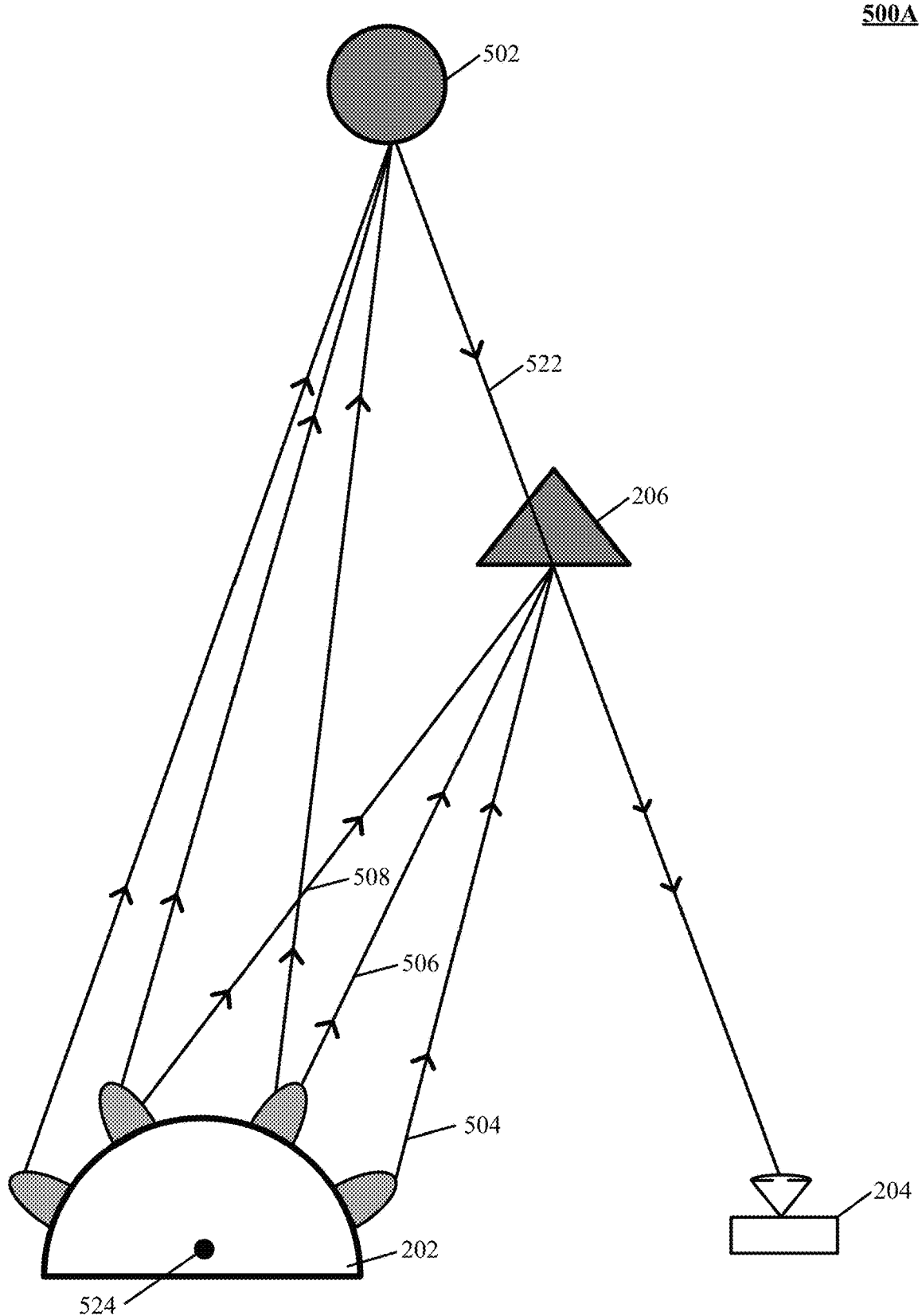
FIGS. 5A and 5B are illustrations of objects and their corresponding reflections as received by a sensor in accordance with an implementation of the technology disclosed.
Figure 5B:
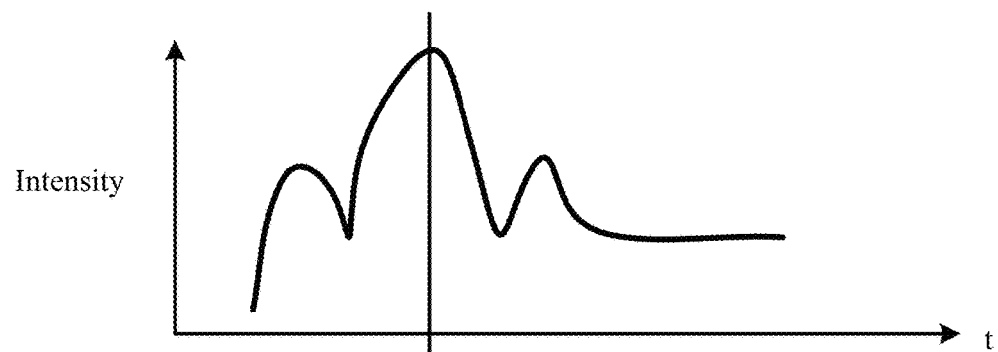
Figure 5B:
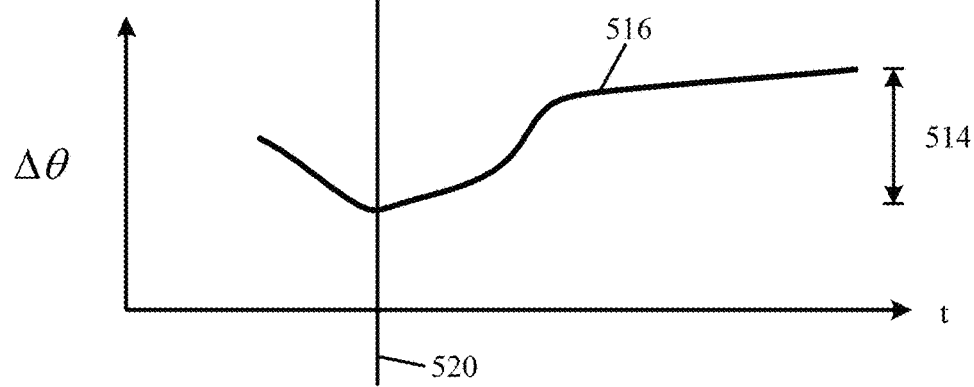
Figure 5B:
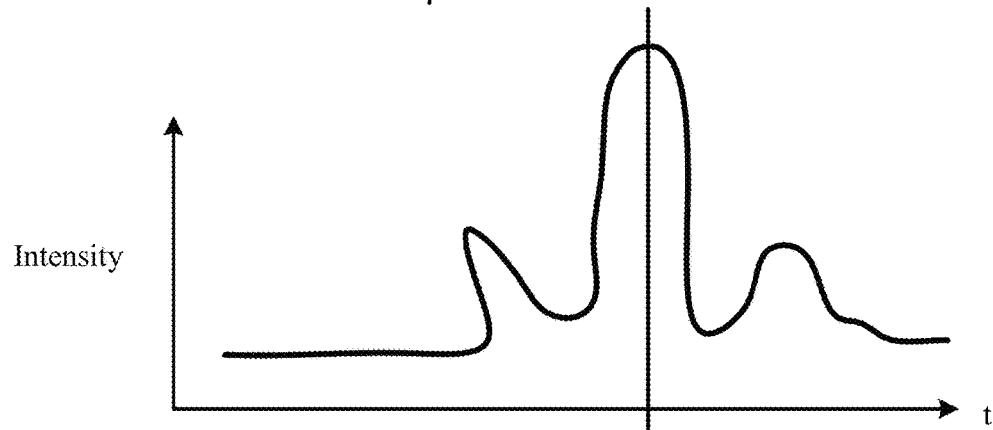
Figure 5B:
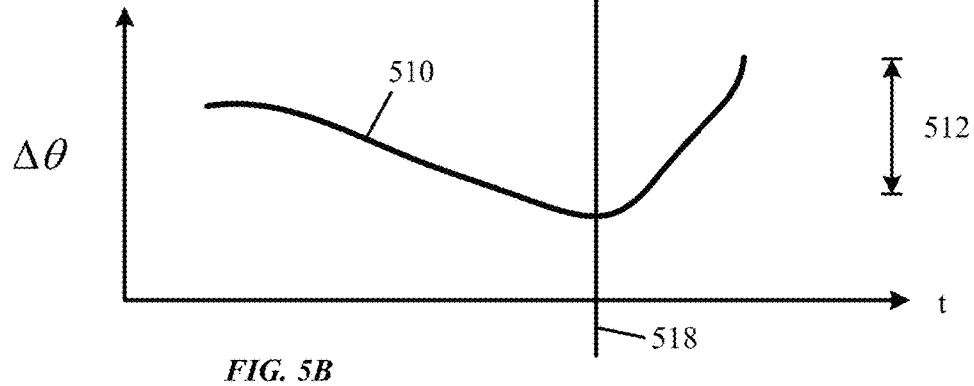

Again with reference to FIG. 4A, flowchart 400 includes receiving, at a sensor, light transmitted from the light sources and reflected from the object (404). The sensor 204 receives the result of the different illumination levels assigned to the light sources 210. FIG. 4B is a graph of variations in intensity between light transmitted from the light sources and received by the sensor. FIG. 4C illustrates exemplary brightness curves for the four light sources A, B, C, D shown in FIG. 2A; the light source A illuminates first, followed by light sources B, C, and D, at which time the light source A illuminates again. The frequency at which each light source A, B, C, D illuminates can be the same (though, as shown, the phase of each light source A, B, C, D differs such that only one light source is illuminated at any given time, as discussed above).

The sensor 204 receives the light cast by the light sources A, B, C, D as reflected by the object 206. The received light varies in amplitude/intensity as a result of the angle of reflection between each light source A, B, C, D and the sensor 204, as shown in illustration 400B; a light source at a high or "steep" angle to the object 206 can illuminate the object 206 with less intensity than a light source more directly facing the object 206. The amplitude/intensity that the waves of the received light exhibits can also vary as a result of the differing paths in the travel path between the light sources A, B, C, D and the sensor 204, as shown in illustration 400B; as a result, the amplitude/intensity that captured light exhibits when it arrives at sensor 204 can vary as the light sources A, B, C, and D illuminate in turn. Thus, the phase of the light received at the sensor 204 will vary according to the different points in the illumination cycle.

Again with reference to FIG. 4A, flowchart 400 includes determining differences in phases of the captured light (406). The phase(s) of the received light can be determined by detecting the peaks (or any other reference point) of the light received at the sensor 204 by any method known in the art. For example, the sensor 204 can include an analog phase detector circuit (and/or an analog peak detector); in one implementation, the phase detector circuit determines the phase(s) of each pixel (or small number of pixels) in turn. The phase detector circuit can "listen" to each pixel over a period of time (long enough to capture multiple cycles of the light broadcast from the transmitter) to improve the accuracy of the detection. The period of time can be predetermined or determined by a "lock" or similar signal generated by the phase detector. If multiple phases are detected at a given pixel, the phase detector circuit can determine each of them in turn or multiple phases at once.

In another implementation, the computer 208 determines the phase by performing a fast-Fourier transform ("FFT") on a series of images read from the sensor 204. In one implementation, the frame rate of the sensor 204 equals and is synchronized with the frequency of the light emitted by the transmitter 202; each frame captured by the sensor 204, therefore, corresponds to a next pulse of emitted light. In other implementations, the frame rate of the sensor 204 is unsynchronized with the frequency of the transmitter 204 and thus captures random pulses of light from the transmitter 204. In any case, the detected phases can be stored and, after a number are collected, analyzed to determine the phases of adjacent light sources 210. As the frame rate of the sensor 204 increases, the accuracy of the distance measurement increases (as explained in greater detail below). In other implementations, the sensor 204 includes a rolling-shutter camera that reads every pixel a large number of times, before proceeding to a next pixel, or a micro-electro-mechanical system ("MEMS") camera having a scanning mirror that raster-scans a scene using a photodiode.

Referring again to FIG. 4A, flowchart 400 includes determining a distance to the object based at least in part on the differences in the phases (408). The differences between the phases (as distinguished from the absolute time values of the phases) can be used to determine the position of the transmitter 204 relative to the object 206. More specifically, the angle that the line between the center point of the transmitter structure 212 and the object 206 makes with a reference, such as the horizontal plane, can be determined.

FIG. 5 is an illustration 500A of objects and their corresponding reflections as received by a sensor in accordance with an implementation of the technology disclosed. FIG. 5 illustrates the transmitter 202, sensor 204, and two example objects 206, 502. The first object 206 is relatively near the transmitter 202 and on its right side; the second object 502 is relatively far from the transmitter 202 and on its left side. Charts of the intensity of light reflected to the sensor 204 from each object 206, 502 are also shown in FIG. 5B, as are charts of the phase difference Δθ corresponding to each object 206, 502. In general, the peak intensity for a pixel/light ray captured by the sensor 204 roughly corresponds to the position of the objects 206, 502; in other words, the light emitted by the light sources mounted on the portion of the transmitter 202 closest to the objects 206, 502 produces the brightest illumination of the objects 206, 504. This relationship may not be true, however, for irregularly shaped objects; a particular facet of an object can be angled such that the sensor 204 sees a brighter illumination from a light source other than the one(s) closest the object.

The phase difference Δθ, unlike the light intensity, has a clear relationship with the position of the objects 206, 502 as a result of the known geometric relationship between the light sources on the transmitter 202. The phase difference Δθ between light rays received from the light sources closest the objects 206, 502 is smaller than the phase difference Δθ between light sources further from the object 206, 502; based on the known geometric relationship between the light sources, the position of the light sources closest the objects 206, 502 can be determined. For example, the two light sources closest to the object 206 produce two light rays 504, 506 of very similar length; the phase difference Δθ between these two light rays 504, 506 is thus very small or zero. A third light ray 508, produced by a light source further from the object 206, is longer; the phase difference Δθ between, for example, light rays 506, 508 is thus greater. In general, the phase difference Δθ between each of the light sources on the transmitter 202, when analyzed, has a minimum value at the point on the transmitter 202 closest to the analyzed object.

The variation in the phase difference Δθ for an object is proportional to the distance between the object and the transmitter 202. An object closer to the transmitter 202, such as the object 206, can exhibit a greater variation in phase difference Δθ than an object farther from the transmitter 202, such as the object 502. For example, the phase difference Δθ 510 corresponding to the object 206 has a greater variation 512 than the variation 514 in the phase difference Δθ 516 corresponding to the object 502. The minima 518, 520 of the phase differences phase difference Δθ are also shown in illustration 500B.

The positions of the minima 518, 520 and/or the variations in phase difference Δθ 512, 514 can be used to determine the distance of the objects 206, 502 from the transmitter 202 and/or sensor 204. As described above with reference to FIG. 2B, the angle of the light ray 522 incoming to the sensor 204 can be determined by mapping a pixel captured by the CCD in the sensor to a point on its lens. This light ray 522 alone, however, does not identify the position of an object, which can lie at any point on it. For example, the two objects 206, 502 both lie on the light ray 522 and, without further analysis, cannot be distinguished. As discussed above, however, the two phase-difference curves 510, 516 for each object 206, 502 differ, and from this information the position of the object on the light ray 522 can be determined.

In one implementation, the positions of the minima 518, 520 can be used to determine the angle between the line formed through a center point 524 of the transmitter 202 and the objects 206, 502 and a reference line (e.g., a horizontal line). In one implementation, the relative position of the minimum within the band of received light rays is mapped onto its corresponding position on the transmitter 202, and the angle of the line is thereby determined. For example, if the minimum occurs in the center of the band, the corresponding position on the transmitter 202 can be at 0° or "north." As another example, if the minimum occurs at 75% of the distance from the left side of the band, the corresponding position on the transmitter 202 can be at 45° or "northeast." In one implementation, the positions of the light sources on the transmitter 202 are used to determine the angle (i.e., the degree of the arc that the light sources sweep through).

Alternatively or in addition, the shapes of the phase difference Δθ curves 510, 516 can be used to determine the distance from the transmitter 202 and the objects 206, 502. As discussed above, objects closer to the transmitter 202 have "deeper" curves and objects further away from the transmitter 202 have "shallower" curves. The distance between the transmitter 202 and the objects 206, 502 can thus be determined by analyzing the shape of the curves 510, 516, by looking up the distance in a shape-to-distance look-up table, or by a combination of the two (or by any other suitable method). In one implementation, an ambiguity between two possible positions on the light ray 522 implied by the determined distance is resolved by analyzing the position of the minimum value of the curve.

Once the angle and/or distance of the object(s) relative to the transmitter 202 has been determined, the distance of the object relative to the transmitter 202, sensor 204, or to any other known point in space can be determined by triangulation. For example, using the angles of the object relative to the transmitter 202 and sensor 202, and the distance between the transmitter 202 and sensor 204, the distance of the object to the camera 204 (or, say, the midpoint between the transmitter 202 and camera 204) can be found by using, for example, the law of sines. One of skill in the art will understand that other unknown values (such as the angle of the lines intersecting at the object 206) can similarly be found.

The accuracy of the distance measurement can be increased by increasing the number of light sources on the transmitter 202. With more light sources, the distance between each light source decreases, thereby allowing a more precise determination of the point on the transmitter 202 closest to the object 206. The accuracy of the measurement can be alternatively or in addition improved by increasing the frame rate of the sensor 204, thereby allowing the collection of more phase data. If the implementation of the phase detection at the sensor 204 is done in an analog fashion, the accuracy can be improved by increasing the "listening time" spent on each pixel, thereby similarly allowing the collection of more phase data. The frequency of the illumination of the light sources on the transmitter 202 can be also increased for the same reason.

The above discussion simplifies the operation of the technology disclosed to two-dimensional space in order to more understandably explain the operation of the technology disclosed, but the technology disclosed is not limited to only two-dimensional space. For example, FIG. 5 implies that the transmitter 202, sensor 204, and object 206 all lay on the horizontal plane, but this need not necessarily be the case. The object 206, for example, can lie at any point above or below the horizontal plane. The sensor 204 detects the angle of the incoming light ray 522 by mapping it to a position sensed on the CCD array; the left-to-right dimension of the CCD array can be used to determine the "x-y" angle of the ray 522, for example, while the top-to-bottom dimension of the CCD array can be used to determine the "z" angle of the ray 522. Whatever the orientation of the ray 522, the techniques described above can be used to determine the position of an object reflecting light along the ray 522. Alternatively and/or in addition, in some implementations, depth ("z") information can be determined from differences in the reflected light obtained from scanning the field of view along two or more intersecting planes, each approximately co-planar to the direction of the light rays illuminated by different sets of light sources. The different sets of light sources can be arranged integrally and/or non-integrally to provide for cross-scanning of the field of view.

Figure 6A:
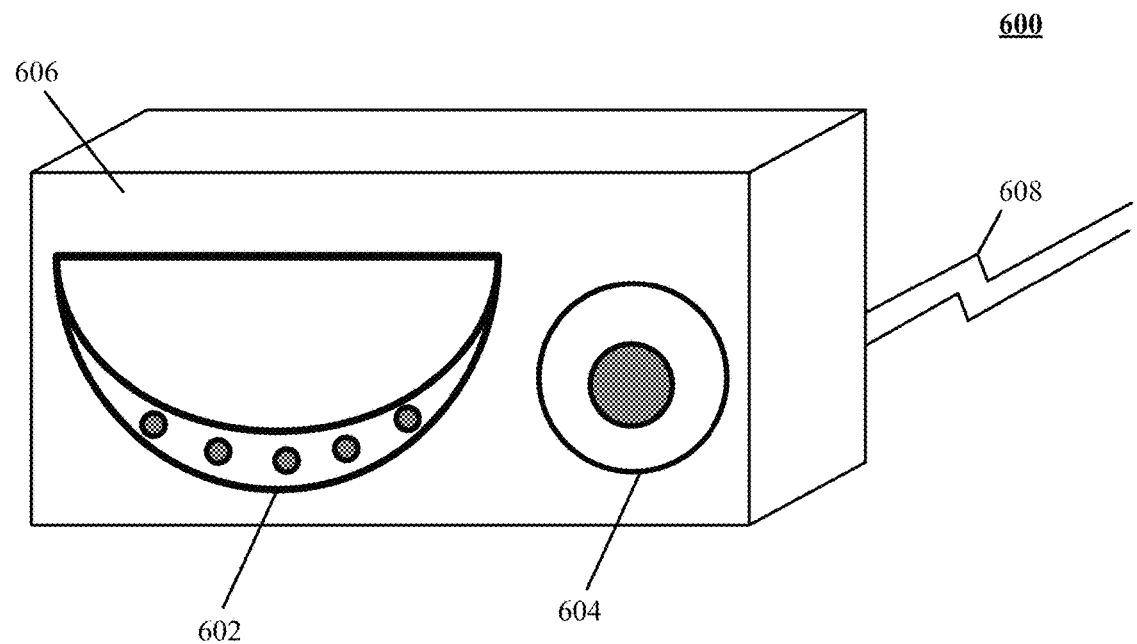
FIGS. 6A and 6B are illustrations of example implementations of the technology disclosed.
Figure 6B:
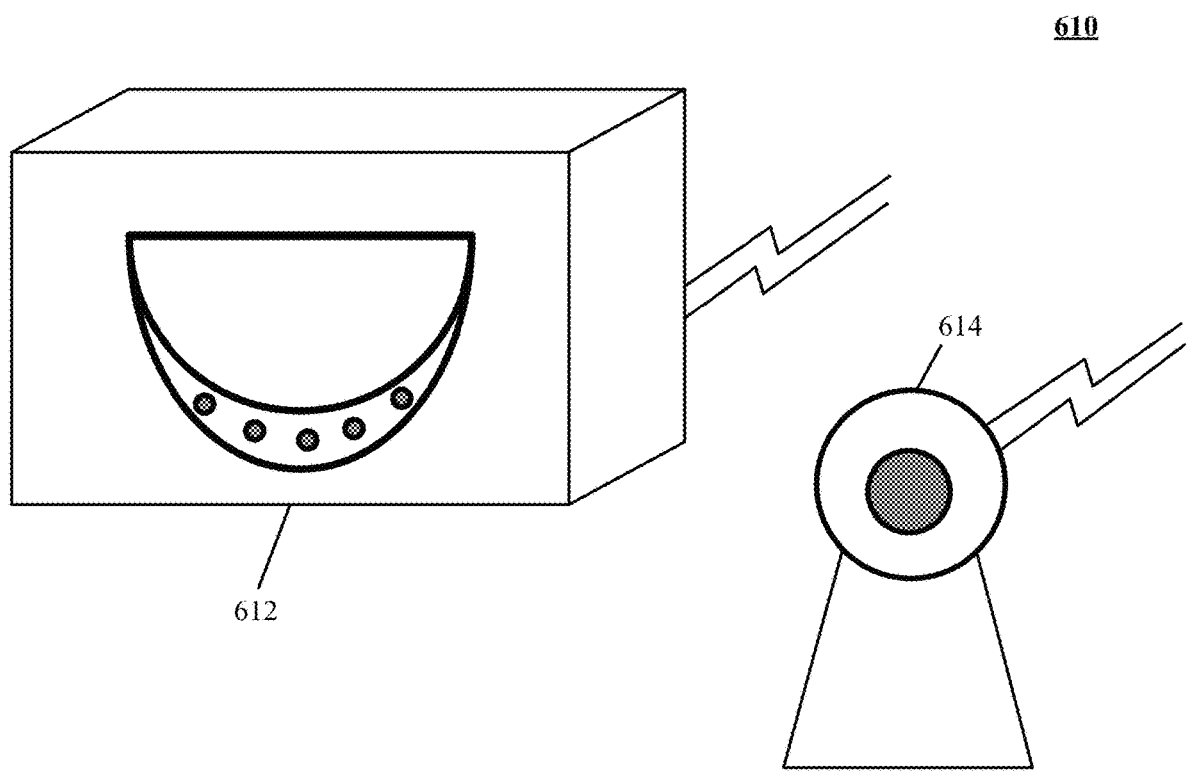

Illustrations of example implementations 600, 610 of the technology disclosed appear in FIGS. 6A and 6B. In FIG. 6A, a transmitter 602 and a sensor 604 are mounted together in a single unit 606; cable(s) 608 can be used to supply power to and communicate with the transmitter 602 and sensor 604. The unit 606 can be of any size, shape, or material; in various implementations, the unit 606 can be integrated with another device (such as a television, automobile, camera, or computer). In FIG. 6B, a transmitter 612 and a sensor 614 are maintained as separate units (one or both of which can alternatively be integrated into another device.

Figure 7:
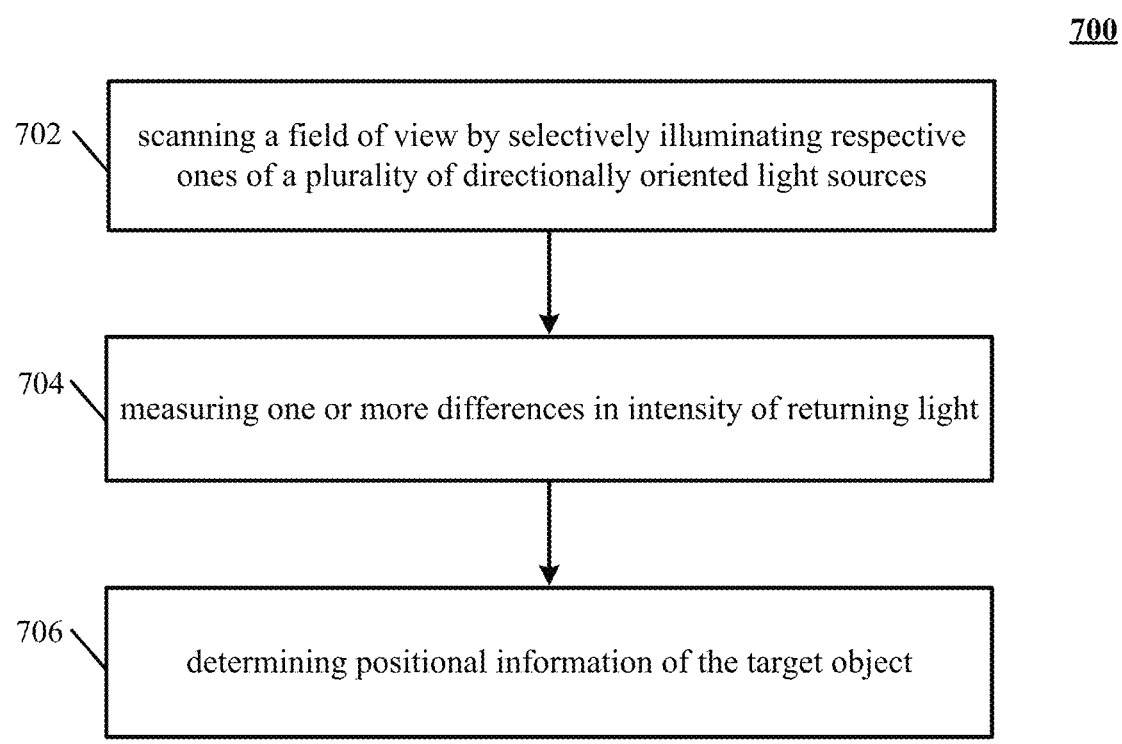
FIG. 7 illustrates one implementation of determining positional information of a target object in a field of view.

FIG. 7 is an illustration 700 of one implementation of determining positional information of a target object in a field of view. Flowchart 700 can be implemented at least partially with and/or by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

At action 702, a field of view is scanned by selectively illuminating respective ones of a plurality of directionally oriented light sources that have overlapping fields of illumination. In one implementation, selectively illuminating the light sources includes at least periodically illuminating the light sources at different levels of brightness. In some implementations, periodically illuminating the light sources at different levels of brightness further includes switching the light sources to at least one of a low dimming setting, medium setting, or a high dimming setting. In other implementations, each of the light sources is illuminated at a different dimming setting.

In one implementation, selectively illuminating the light sources includes at least periodically illuminating the light sources at different frequencies to provide differences in color properties between the emitted light. In another implementation, selectively illuminating the light sources includes at least periodically illuminating the light sources one-at-a-time such that a first light source is turned off before a second light source is turned on. In yet another implementation, selectively illuminating the light sources includes at least periodically illuminating a subset of light sources from the plurality of light sources. Some other implementations include periodically illuminating the light sources sequentially based on at least one of a logarithmic, quadratic, exponential, and/or Gaussian pattern.

At action 704, one or more differences in intensity of returning light emitted from the respective light sources and reflected from the target object using a sensor are measured. In one implementation, the received light varies in intensity as a result of the angle of reflection between the respective light sources and the sensor. For example, a light source at a high or "steep" angle to the object can illuminate the object with less intensity than a light source more directly facing the object. In another implementation, the intensity that the waves of the received light exhibits can also vary as a result of the differing distances in the travel path between the respective light sources and the sensor. In one instance, light received from a light source that travels a greater distance to reach the sensor than light received from a light source that travels a lesser distance. As a result, the intensity that captured light exhibits when it arrives at sensor can vary as the respective light sources illuminate in turn.

At action 706, positional information of the target object is determined based at least in part upon one or more measured differences in intensity of the returning light. In one implementation, one or more angles for the light reflected from the target object is determined with respect to the sensor by mapping pixels of a camera array that captured the reflected light to the one or more angles. In another implementation, when the sensor is positioned apart from the plurality of light sources and not between two of the light sources, an angle between the plurality of light sources and the target object is determined.

In some implementations, a distance of the target object from the light sources or the sensor is determined using an angle between at least one of the light sources and the target object and a second angle between the sensor and the target object. In other implementations, a depth of the field of view is determined by identifying stereoscopic differences between light reflected from the target object, including at least one of scanning the field of view along a single plane that is co-planar to a direction of the light emitted from the plurality of light sources or scanning the field of view along two or more intersecting planes that are co-planar to a direction of the light emitted from the plurality of light sources.

Figure 8:
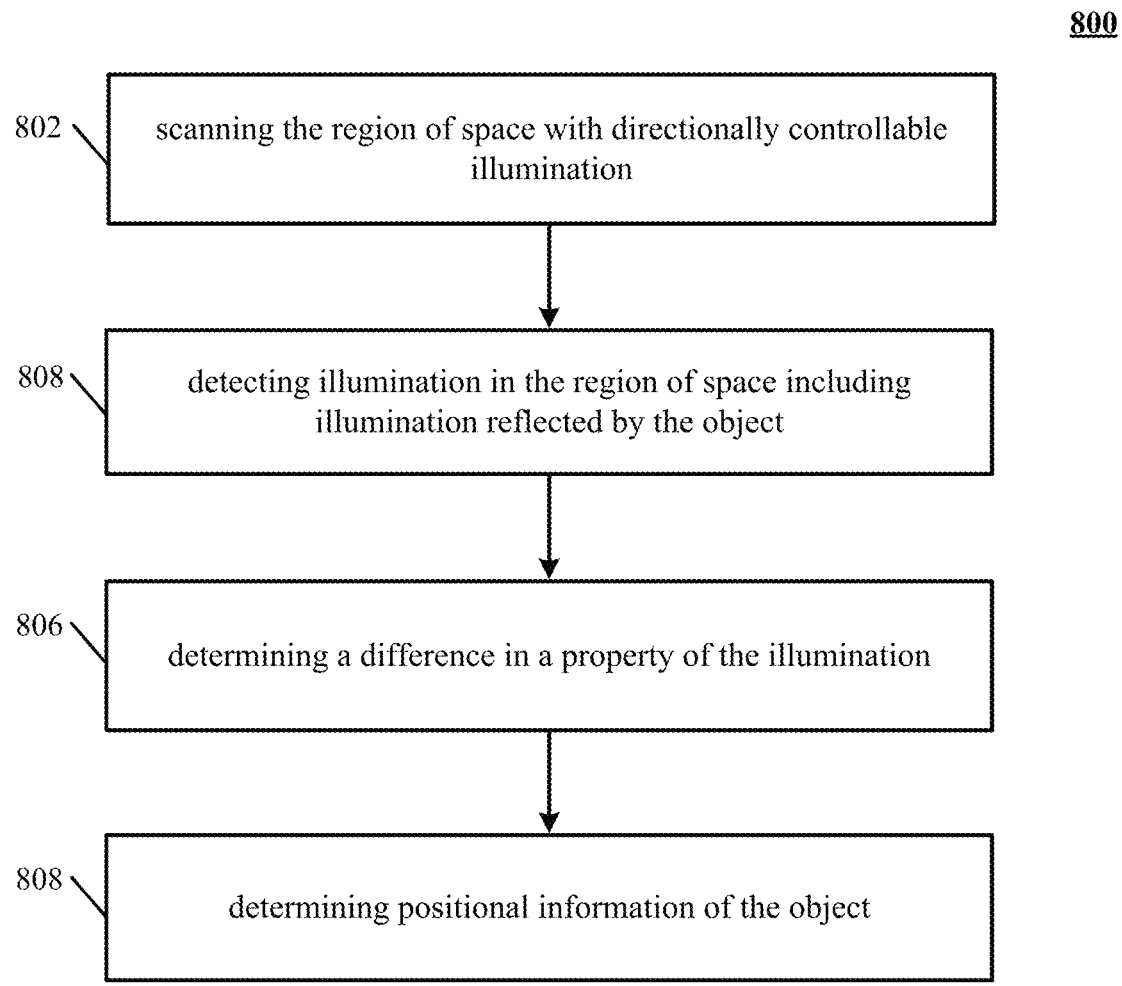
FIG. 8 is a flowchart showing of a method of finding an object in a region of space.

FIG. 8 is a flowchart 800 showing of a method of finding an object in a region of space. Flowchart 800 can be implemented at least partially with and/or by one or more processors configured to receive or retrieve information, Process the information, store results, and transmit the results. Other implementations may perform the actions in different orders and/or with different, fewer or additional actions than those illustrated in FIG. 8. Multiple actions can be combined in some implementations. For convenience, this flowchart is described with reference to the system that carries out a method. The system is not necessarily part of the method.

At action 802, the region of space is scanned with directionally controllable illumination from selected ones of a set of illumination sources. In one implementation, directionally controllable illumination includes at least periodically illuminating the illumination sources at different levels of brightness. In some implementations, periodically illuminating the illumination sources at different levels of brightness further includes switching the illumination sources to at least one of a low dimming setting, medium setting, or a high dimming setting. In other implementations, each of the illumination sources is illuminated at a different dimming setting.

In one implementation, directionally controllable illumination includes at least periodically illuminating the illumination sources at different frequencies to provide differences in color properties between the emitted light. In another implementation, directionally controllable illumination includes at least periodically illuminating the illumination sources one-at-a-time such that a first illumination t source is turned off before a second illumination source is turned on. In yet another implementation, directionally controllable illumination includes at least periodically illuminating a subset of illumination sources from the plurality of illumination sources. Some other implementations include periodically illuminating the illumination sources sequentially based on at least one of a logarithmic, quadratic, exponential, and/or Gaussian pattern.

In one implementation, the illuminations sources are arranged on one or more non-planar arcuate surfaces that include at least one of one or more segments of an arc or one or more segments of an N-sided polygon. In another implementation, the illumination sources are arranged on one or more planar surfaces and directed at different angles.

At action 804, illumination in the region of space is detected that includes illumination reflected by the object. In one implementation, a coarse scan of the space is performed to assemble a low-resolution estimate of the object position by illuminating a subset of illumination sources from the set of illumination sources. In another implementation, the coarse scan is followed by performing a fine-grained scan of a subsection the space based on the low-resolution estimate of the object position and distinguishing features of the object are identified based on a high-resolution data set collected during the fine-grained scan.

At action 806, a difference in a property of the illumination received for two or more points in the scanning is determined. In some implementations, the property is intensity of light. In one implementation, the received light varies in intensity as a result of the angle of reflection between the respective ones of the illumination sources and a sensor that captures the light. For example, an illumination source at a high or "steep" angle to the object can illuminate the object with less intensity than an illumination source more directly facing the object. In another implementation, the intensity that the waves of the received light exhibits can also vary as a result of the differing distances in the travel path between the respective of the illumination sources and the sensor. In one instance, light received from an illumination source that travels a greater distance to reach the sensor than light received from an illumination source that travels a lesser distance. As a result, the intensity that captured light exhibits when it arrives at sensor can vary as the respective one of the illumination sources illuminate in turn.

At action 808, positional information of the object is determined based at least in part upon the points in the scanning corresponding to the difference in the property. In one implementation, one or more angles for the light reflected from the object is determined with respect to a sensor by mapping pixels of a camera array that captured the reflected light to the one or more angles. In another implementation, when the sensor is positioned apart from the plurality of illumination sources and not between two of the illumination sources, an angle between the plurality of illumination sources and the target object is determined.

In some implementations, a distance of the object from the illumination sources or the sensor is determined using an angle between at least one of the illumination sources and the object and a second angle between the sensor and the object. In other implementations, a depth of the field of view is determined by identifying stereoscopic differences between one or more light reflected from the object, including at least one of scanning the space along a single plane that is co-planar to a direction of the light emitted from the plurality of illumination sources or scanning the field of view along two or more intersecting planes that are co-planar to a direction of the light emitted from the plurality of illumination sources.

Implementations of the technology disclosed can be used to map out the positions of objects in room or similarly sized area in order to precisely locate the objects, people, or other things in the room, as well as the room walls and/or other room dimensions. This information can be used by a computer, television, or other device in the room to improve the experience of a user of the device by, for example, allowing the user to interact with the device based on the room dimensions. The device can adjust a property (e.g., a sound level, sound distribution, brightness, or user-interface perspective) based on objects in the room or the position of the user.

Implementations can be realized by incorporating time-measurement based approaches to obtain additional information about target objects. For example, light source A can emit a pulse of light at t=10 ns and light source B can emit a pulse of light at t=11 ns; the pulse from light source A can arrive at the sensor 204 at t=10.5 ns while the pulse from light source B can arrive at t=11.6 ns. In this example, $\theta_A$=0.5 ns and $\theta_B$=0.6 ns. While such approaches may not yield precision for many applications, these approaches can be used to provide a "coarse" view of the target object upon which techniques yielding more precise results herein described can be applied.

Implementations can employed in a variety of application areas, such as for example and without limitation consumer applications including interfaces for computer systems, laptops, tablets, television, game consoles, set top boxes, telephone devices and/or interfaces to other devices; medical applications including controlling devices for performing robotic surgery, medical imaging systems and applications such as CT, ultrasound, x-ray, MRI or the like, laboratory test and diagnostics systems and/or nuclear medicine devices and systems; prosthetics applications including interfaces to devices providing assistance to persons under handicap, disability, recovering from surgery, and/or other infirmity; defense applications including interfaces to aircraft operational controls, navigations systems control, on-board entertainment systems control and/or environmental systems control; automotive applications including interfaces to automobile operational systems control, navigation systems control, on-board entertainment systems control and/or environmental systems control; security applications including, monitoring secure areas for suspicious activity or unauthorized personnel; manufacturing and/or process applications including interfaces to assembly robots, automated test apparatus, work conveyance devices such as conveyors, and/or other factory floor systems and devices, genetic sequencing machines, semiconductor fabrication related machinery, chemical process machinery and/or the like; and/or combinations thereof.

Implementations of the technology disclosed can further be mounted on automobiles or other mobile platforms to provide information to systems therein as to the outside environment (e.g., the positions of other automobiles). Further implementations of the technology disclosed can be used to track the motion of objects in a field of view or used in conjunction with other mobile-tracking systems. Object tracking can be employed, for example, to recognize gestures or to allow the user to interact with a computationally rendered environment; see, e.g., U.S. Patent Application Ser. No. 61/752,725 (filed on Jan. 15, 2013) and Ser. No. 13/742,953 (filed on Jan. 16, 2013), the entire disclosures of which are hereby incorporated by reference.

It should also be noted that implementations of the technology disclosed can be provided as one or more computer-readable programs embodied on or in one or more articles of manufacture. The article of manufacture can be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs can be implemented in any programming language. Some examples of languages that can be used include C, C++, or JAVA. The software programs can be further translated into machine language or virtual machine instructions and stored in a program file in that form. The program file can then be stored on or in one or more of the articles of manufacture.

Particular Implementations

In one implementation, a method of tracking movement of an object portion in three-dimensional (3D) space is described. The method includes scanning a field of view by selectively illuminating respective ones of a plurality of directionally oriented light sources that have overlapping fields of illumination, measuring one or more differences in intensity of returning light emitted from the respective light sources and reflected from the target object using a sensor, and determining positional information of the target object based at least in part upon one or more measured differences in intensity of the returning light.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

In one implementation, the method includes selectively illuminating the respective light sources includes varying brightness of pairs of overlapping light sources by dimming a first, initially on light source while brightening a second, initially off light source. In some implementations, the brightness of the two overlapping light sources is varied by applying a quadratic formula. In other implementations, the brightness of the two overlapping light sources according to a Gaussian distribution.

In one implementation, the respective light sources are illuminated selectively one at a time. In another implementation, the sensor scans the field of view using a scanning mirror and a photo detector that rasterizes the field of view. In some implementations, the respective light sources are distinguished based on different frequencies of the respective light sources.

In one implementation, one or more angles are determined for the light reflected from the target object with respect to the sensor by mapping pixels of a camera array that captured the reflected light to the one or more angles. When the sensor is positioned apart from the plurality of light sources and not between two of the light sources, an angle between the plurality of light sources and the target object is determined. In some implementations, a distance of the target object from the light sources or the sensor is determined using an angle between at least one of the light sources and the target object and a second angle between the sensor and the target object.

In another implementation, two or more of the light sources are illuminated respectively at different intensities of illumination. In some implementations, a coarse scan of the field of view is performed to assemble a low-resolution estimate of the target object position by illuminating a subset of light sources from the plurality of light sources. In other implementations, the coarse scan is followed by performing a fine-grained scan of a subsection the field of view based on the low-resolution estimate of the target object position and identifying distinguishing features of the target object based on a high-resolution data set collected during the fine-grained scan. In yet another implementation, a plurality of scans of the field of view is performed and varying light properties of light are emitted from the respective light sources among the scans.

In one implementation, the plurality of directional light sources is arranged on one or more non-planar arcuate surfaces that include at least one of an arc or an N-sided polygon. In another implementation, the plurality of directional light sources is arranged along a parabolic or hyperbolic curve. Some other implementations include determining phase differences includes performing a Fourier transform on a series of intensity measurements of the light reflected from the target object.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method of determining positional information of a target object in a field of view is described. The method includes scanning a field of view by selectively illuminating respective ones of a plurality of directionally oriented light sources that have overlapping fields of illumination, measuring one or more differences in property of returning light emitted from the respective light sources and reflected from the target object using a sensor, and determining positional information of the target object based at least in part upon one or more measured differences in property of the returning light. In some implementations, the property is intensity of light.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a system of determining positional information of a target object in a field of view is described. The system includes a processor and a computer readable storage medium storing computer instructions configured to cause the processor to scan a field of view by selectively illuminating respective ones of a plurality of directionally oriented light sources that have overlapping fields of illumination, measure one or more differences in intensity of returning light emitted from the respective light sources and reflected from the target object using a sensor, and determine positional information of the target object based at least in part upon one or more measured differences in intensity of the returning light.

In another implementation, a method of finding an object in a region of space is described. The method includes scanning the region of space with directionally controllable illumination from selected ones of a set of illumination sources, detecting illumination in the region of space including illumination reflected by the object, determining a difference in a property of the illumination received for two or more points in the scanning, and determining positional information of the object based at least in part upon the points in the scanning corresponding to the difference in the property.

This method and other implementations of the technology disclosed can include one or more of the following features and/or features described in connection with additional methods disclosed.

In one implementation, the method includes conducting a second scanning of the region of space to obtain second positional information of the object and determining a change in the object based upon a comparison of a result from a first scanning and a result from the second scanning.

In another implementation, the method includes conducting a second scanning limited to a portion of the region of space corresponding to the positional information of the object obtained from a first scanning and determining additional positional information of the object based upon a result from the second scanning. In some implementations, the second scanning includes a second scanning limited to a portion of the region of space corresponding to the positional information of the object obtained from a first scanning and determining additional positional information of the object based upon a result from the second scanning.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Certain implementations of the technology disclosed were described above. It is, however, expressly noted that the technology disclosed is not limited to those implementations, but rather the intention is that additions and modifications to what was expressly described herein are also included within the scope of the technology disclosed. For example, it can be appreciated that the techniques, devices and systems described herein with reference to examples employing light waves are equally applicable to methods and systems employing other types of radiant energy waves, such as acoustical energy or the like. Moreover, it is to be understood that the features of the various implementations described herein were not mutually exclusive and can exist in various combinations and permutations, even if such combinations or permutations were not made express herein, without departing from the spirit and scope of the technology disclosed. In fact, variations, modifications, and other implementations of what was described herein will occur to those of ordinary skill in the art without departing from the spirit and the scope of the technology disclosed. As such, the technology disclosed is not to be defined only by the preceding illustrative description.

What is claimed is:

1. A method of determining positional information of a target object in a region of space within range of a light sensitive sensor, the method including:
    scanning the region of space monitored by the light sensitive sensor by selectively illuminating respective directionally oriented non-coplanar light sources of a plurality of directionally oriented light sources that (i) are mounted to a single surface and (ii) have at least some overlapping fields of illumination;
    measuring, using the light sensitive sensor, one or more differences in an intensity of returning light emitted from the respective directionally oriented non-coplanar light sources and reflected from the target object as the target object moves through the region of space; and
    recognizing signals in response to (i) positional information of the target object determined based on at least, a first position in space at a first time t0 and a second position in space at a second time t1 sensed using the measured one or more differences in the intensity of the returning light and (ii) a non-coplanar movement of the target object.

2. The method of claim 1, wherein the selectively illuminating of the respective directionally oriented non-coplanar light sources includes varying a brightness of a pair of overlapping directionally oriented light sources by dimming a first directionally oriented light source of the pair, which is initially on while brightening a second directionally oriented light source of the pair, which is initially off.

3. The method of claim 2, further including varying the brightness of the pair of overlapping directionally oriented light sources according to a Gaussian distribution.

4. The method of claim 2, further including illuminating two or more directionally oriented light sources of the plurality of directionally oriented light sources respectively at different intensities of illumination.

5. The method of claim 2, further including performing a coarse scan of the region of space to assemble a low-resolution estimate of a position of the target object by illuminating a subset of directionally oriented light sources from the plurality of directionally oriented light sources.

6. The method of claim 1, further including selectively illuminating the respective directionally oriented non-coplanar light sources one at a time.

7. The method of claim 1, further including the light sensitive sensor scanning the region of space using a scanning mirror and a photo detector that rasterizes the region of space within the range of the light sensitive sensor.

8. The method of claim 1, further including distinguishing among the respective directionally oriented non-coplanar light sources based on different frequencies of the respective directionally oriented non-coplanar light sources.

9. The method of claim 1, further including determining one or more angles for the returning light reflected from the target object, with respect to the sensor by mapping pixels of a camera array that captured the returning light reflected from the target object to the one or more angles.

10. The method of claim 1,
    wherein the sensor is positioned apart from the plurality of directionally oriented light sources and not between any two directionally oriented light sources of the plurality of directionally oriented light sources, and
    wherein the method further includes determining an angle between the plurality of directionally oriented light sources and the target object.

11. The method of claim 10, further including determining a distance of the target object from the plurality of directionally oriented light sources or the sensor using:
   an angle between at least one directionally oriented light source of the plurality of directionally oriented light sources and the target object; and
   a second angle between the sensor and the target object.

12. The method of claim 1, further including performing a plurality of scans of the region of space and varying light properties of light emitted from the respective directionally oriented non-coplanar light sources among the plurality of scans.

13. The method of claim 1, wherein the single surface is at least one of:
   an arc; and
   an N-sided polygon.

14. The method of claim 1, wherein the recognizing of the signals recognizes gesture control in response to (i) the positional information and (ii) the non-coplanar movement of the target object.

15. A method of determining positional information of a target object in a region of space within range of a light sensitive sensor, the method including:
   scanning the region of space monitored by the light sensitive sensor by selectively illuminating respective directionally oriented non-coplanar light sources of a plurality of directionally oriented light sources that (i) are mounted to a single surface and (ii) have at least some overlapping fields of illumination;
   measuring, using the light sensitive sensor, one or more differences in a property of returning light emitted from the respective directionally oriented non-coplanar light sources and reflected from the target object as the target object moves through the region of space; and
   recognizing signals in response to (i) positional information of the target object determined based on at least, a first position in space at a first time tO and a second position in space at a second time t1 sensed using the measured one or more differences in the property of the returning light and (ii) a non-coplanar movement of the target object.

16. The method of claim 15, wherein the property is an intensity of light.

17. A method of determining positional information of an object in a region of space within range of a light sensitive sensor, the method including:
   scanning the region of space monitored by the light sensitive sensor with directionally controllable illumination from selected directionally oriented non-coplanar illumination sources of a set of directionally oriented illumination sources that are mounted to a single surface;
   detecting illumination in the region of space including illumination reflected by non-coplanar movement of the object as the object moves through the region of space;
   determining a difference in a property of the illumination received for two or more points in the scanning;
   determining positional information of the object to identify the non-coplanar movement of the object; and
   generating, by a computer system, a three-dimensional model of the object.

18. The method of claim 17, further including:
conducting a second scanning of the region of space to obtain second positional information of the object; and
determining a change in the object based upon a comparison of a result from a first scanning and a result from the second scanning.

19. The method of claim 17, further including:
conducting a second scanning limited to a portion of the region of space corresponding to the positional information of the object obtained from a first scanning; and
determining additional positional information of the object based upon a result from the second scanning.

20. The method of claim 19,
wherein the second scanning includes conducting the second scanning using a greater number of directionally oriented illumination sources of the set of directionally oriented illumination sources than used during a first scanning, and
wherein the determining of the positional information comprises determining the positional information of the object for additional accuracy based upon the result from the second scanning.

* * * * *

UNITED STATES PATENT AND TRADEMARK OFFICE
CERTIFICATE OF CORRECTION

| | |
|---|---|
| PATENT NO. | : 10,585,193 B2 |
| APPLICATION NO. | : 15/936185 |
| DATED | : March 10, 2020 |
| INVENTOR(S) | : David Holz |

It is certified that error appears in the above-identified patent and that said Letters Patent is hereby corrected as shown below:

In the Claims

In Claim 1, at Column 20, Line 20, after "a first time" change "tO" to -- t0 --.

In Claim 15, at Column 21, Line 37, after "a first time" change "tO" to -- t0 --.

Signed and Sealed this
Twelfth Day of September, 2023

Katherine Kelly Vidal
*Director of the United States Patent and Trademark Office*